United States Patent
Park et al.

(10) Patent No.: US 11,268,715 B2
(45) Date of Patent: Mar. 8, 2022

(54) BUILDING AUTOMATION SYSTEMS FOR ONLINE, OFFLINE, AND HYBRID LICENSING OF DISTRIBUTED EDGE DEVICES

(71) Applicant: Johnson Controls Technology Company, Auburn Hills, MI (US)

(72) Inventors: Youngchoon Park, Brookfield, WI (US); Justin J. Ploegert, Cudahy, WI (US); Erik S. Paulson, Madison, WI (US); Sudhi R. Sinha, Milwaukee, WI (US)

(73) Assignee: Johnson Controls Technology Company, Auburn Hills, MI (US)

(*) Notice: Subject to any disclaimer, the term of this patent is extended or adjusted under 35 U.S.C. 154(b) by 0 days.

(21) Appl. No.: 16/728,842

(22) Filed: Dec. 27, 2019

(65) Prior Publication Data

US 2020/0278127 A1    Sep. 3, 2020

Related U.S. Application Data

(63) Continuation of application No. 15/639,880, filed on Jun. 30, 2017, now Pat. No. 10,520,210.
(Continued)

(51) Int. Cl.
*F24F 11/30* (2018.01)
*G06Q 50/06* (2012.01)
(Continued)

(52) U.S. Cl.
CPC ............ *F24F 11/30* (2018.01); *G06F 21/602* (2013.01); *G06Q 10/063* (2013.01);
(Continued)

(58) Field of Classification Search
CPC .. F24F 11/30; F24F 11/62; F24F 11/54; F24F 11/42; G06Q 10/06315; G06Q 10/063; G06Q 50/06; G06F 21/602
(Continued)

(56) References Cited

U.S. PATENT DOCUMENTS

| | | | |
|---|---|---|---|
| 8,776,254 B1 | 7/2014 | Mraz et al. | |
| 2003/0040842 A1* | 2/2003 | Poth | G06Q 50/06 700/275 |

(Continued)

FOREIGN PATENT DOCUMENTS

| | | | |
|---|---|---|---|
| CN | 101821696 | 9/2010 | |
| CN | 105989295 | 10/2016 | |
| WO | WO-2016064337 A1 * | 4/2016 | G06Q 10/06311 |

OTHER PUBLICATIONS

International Search Report and Written Opinion for PCT/US2017/054842, dated Dec. 12, 2017, 15 pages.
(Continued)

*Primary Examiner* — Mohammad W Reza
(74) *Attorney, Agent, or Firm* — Foley & Lardner LLP

(57) ABSTRACT

A heating ventilation and air conditioning (HVAC) system for a building space includes an HVAC device including a processing circuit. The processing circuit is configured to generate an encrypted dynamic key based on a manifest stored on the device. The manifest includes a set of entitlements for the HVAC device based on relationships between the HVAC device and entities. The processing circuit is further configured to transmit the stored manifest to an authentication server by sending the encrypted dynamic key to the authentication server and receive an updated manifest from the authentication server based on the encrypted dynamic key. The processing circuit is further configured to send a payload request to the authentication server based on
(Continued)

the updated manifest, the payload request including a software update request.

20 Claims, 19 Drawing Sheets

Related U.S. Application Data

(60) Provisional application No. 62/415,447, filed on Oct. 31, 2016.

(51) Int. Cl.
    *G06Q 10/06*     (2012.01)
    *G06F 21/60*     (2013.01)
    *F24F 11/62*     (2018.01)
    *F24F 11/42*     (2018.01)
    *F24F 11/54*     (2018.01)

(52) U.S. Cl.
    CPC ....... *G06Q 10/06315* (2013.01); *G06Q 50/06* (2013.01); *F24F 11/42* (2018.01); *F24F 11/54* (2018.01); *F24F 11/62* (2018.01)

(58) Field of Classification Search
    USPC ......................................................... 726/27
    See application file for complete search history.

(56) References Cited

U.S. PATENT DOCUMENTS

| | | |
|---|---|---|
| 2005/0097543 A1 | 5/2005 | Hirayama |
| 2009/0048691 A1 | 2/2009 | Donaldson |
| 2010/0324962 A1 | 12/2010 | Nesler et al. |
| 2013/0024028 A1 | 1/2013 | Hadzidedic |
| 2013/0085614 A1 | 4/2013 | Wenzel et al. |
| 2013/0087628 A1* | 4/2013 | Nelson ................. F24F 11/30 236/51 |
| 2014/0029735 A1 | 1/2014 | Davis |
| 2014/0208433 A1 | 7/2014 | Mraz et al. |
| 2015/0063164 A1 | 3/2015 | Hemphill et al. |
| 2015/0074658 A1* | 3/2015 | Gourlay ................. F24F 11/30 717/172 |
| 2015/0112867 A1 | 4/2015 | Ramberg |
| 2015/0121070 A1 | 4/2015 | Lau et al. |
| 2015/0167995 A1* | 6/2015 | Fadell .................... F24F 11/30 700/275 |
| 2015/0370615 A1 | 12/2015 | Pi-Sunyer |
| 2015/0370621 A1* | 12/2015 | Karp .................... H04L 67/12 719/328 |
| 2016/0116179 A1* | 4/2016 | Land, III ............... F24F 11/89 700/276 |

OTHER PUBLICATIONS

Office Action on CN 201780081701.4, dated Sep. 2, 2020, 9 pages.
Office Action on CN 201780081701.4, dated May 6, 2021, 7 pages with English language translation.

* cited by examiner

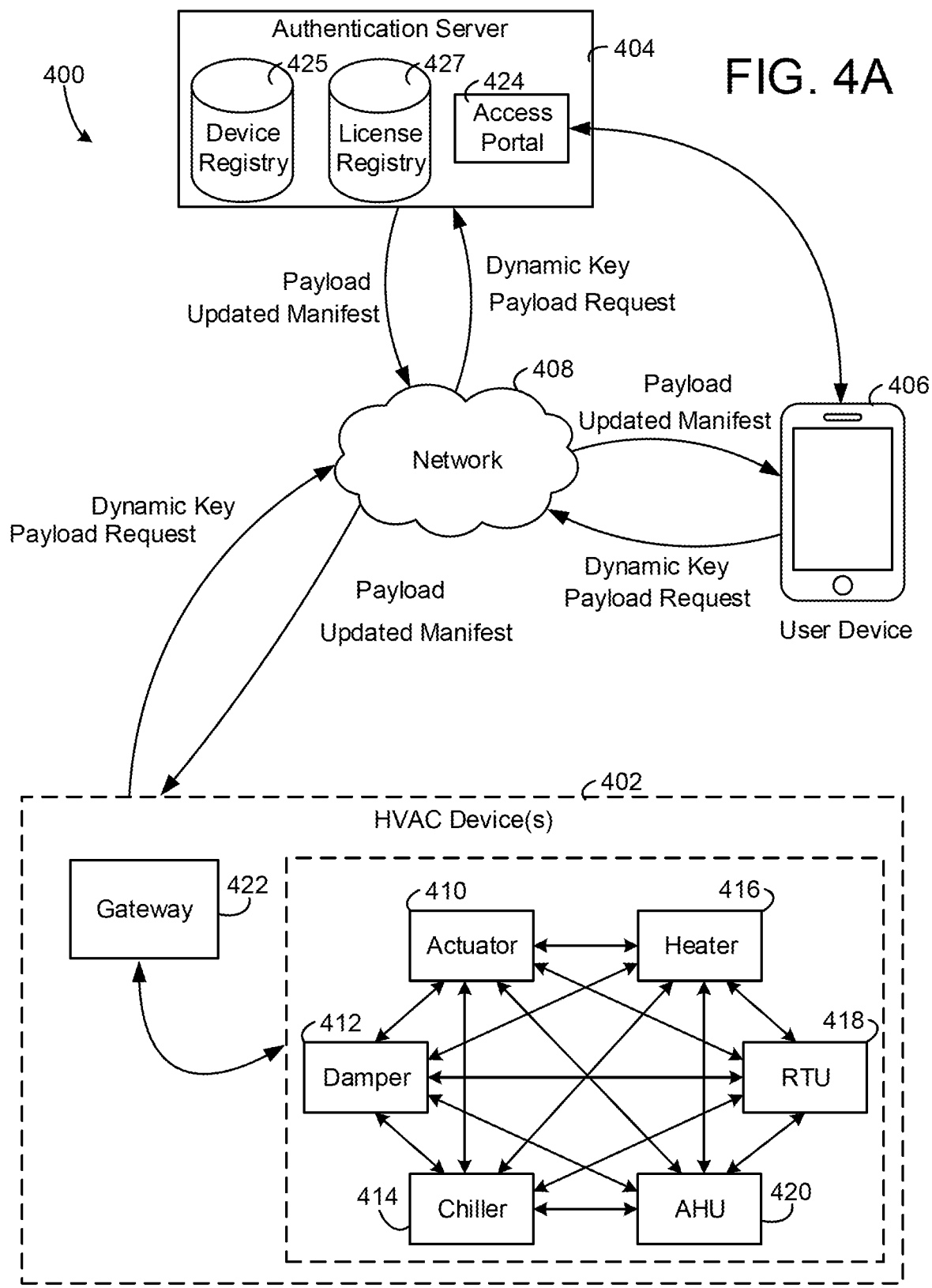

700

Table A
Group-User Relationships

| Group | User |
|---|---|
| Group A 712 | User 1 718 |
| Group B 714 | User 1 718 |
| Group C 716 | User 2 720 |

Table B
Group-Device Relationships

| Group | Device |
|---|---|
| Group A 712 | Device 1 722 |
| Group B 714 | Device 3 726 |
| Group C 716 | Device 3 726 |

Table C
Device-User Relationships

| Device | User |
|---|---|
| Device 1 722 | User 1 718 |
| Device 2 724 | User 2 720 |
| Device 3 726 | User 3 728 |

Table D
Software Version-Environment Relationships

| Software Version | Environment |
|---|---|
| Software Version 1 730 | Environment A 736 |
| Software Version 2 732 | Environment B 738 |
| Software Version 3 734 | Environment C 740 |

Table E
Device-Environment Relationships

| Device | Environment |
|---|---|
| Device 1 722 | Environment A 736 |
| Device 2 724 | Environment B 738 |
| Device 3 726 | Environment C 740 |

Table F
Entity-Entitlement

| Entity | Entitlement |
|---|---|
| Device 1 722 | A 742 |
| Group A 712 | B 744 |
| User 3 728 | C 746 |

FIG. 7

Device Registration — 1100

- Device Name: _____ 1102
- Device Key: _____ 1104
- Registration Status: _____ 1106

[Register] 1108

License Inventory — 1111

Connection Status: Online — 1113

| Products and Features 1112 | License Type 1114 | Status 1116 | Expires 1118 | Update 1120 |
|---|---|---|---|---|
| Management Software A | Subscription, 3-Year Basic | Licensed | 02/11/2020 | [Deactivate] |
| Software Add On C | 2 Year Term | Unlicensed | | [Activate] |
| Software B | Trial | Expired | 03/01/2016 | [Extend] |

Activate New — 1122

Activation ID: XXXX-XXX-XXXX-XXXX — 1124

(+) (Add more Activation IDs)

[Cancel] 1126
[Activate] 1128

Downloads 1130

| | Installed Version 1132 | Available Version 1134 | Status 1136 | Progress 1138 | |
|---|---|---|---|---|---|
| Software A | 1.1.2 | 1.1.2 | Downloaded | ■■■■ | [Update] 1140 |
| Software D | 0.0.2 | 0.2.2 | Pending | ■■□□ | [Refresh] 1142 |
| Software E | N/A | 0.1.1 | Pending | ■■■□ | [Download All] 1144 |

FIG. 11

BUILDING AUTOMATION SYSTEMS FOR ONLINE, OFFLINE, AND HYBRID LICENSING OF DISTRIBUTED EDGE DEVICES

CROSS-REFERENCE TO RELATED PATENT APPLICATION

This application is a continuation of U.S. patent application Ser. No. 15/639,880, filed Jun. 30, 2017, which claims the benefit of priority to U.S. Provisional Patent Application No. 62/415,447 filed Oct. 31, 2016, the entire disclosure of each of which is incorporated by reference herein.

BACKGROUND

Devices in a heating ventilation and air conditioning (HVAC) system network do not have a secure, easy-to-use method for authentication and software licensing. Traditional logins may require users to remember login credentials associated with various devices and thus rely on the user remembering the credentials to authenticate the user with the device. Regarding licensing, devices may rely solely on network connectivity to license software and thus network connection is mandatory for licensing software. This may be undesirable because in a HVAC network, devices are not always online and in some cases, are never online.

SUMMARY

One implementation of the present disclosure is a HVAC system for a building space including an HVAC device. The HVAC device includes a processing circuit configured to generate an encrypted dynamic key based on a manifest stored on the device. The manifest includes a set of entitlements for the HVAC device based on relationships between the HVAC device and entities. The processing circuit is configured to transmit the stored manifest to an authentication server by sending the encrypted dynamic key to the authentication server and receive an updated manifest from the authentication server based on the encrypted dynamic key. The processing circuit is configured to send a payload request to the authentication server based on the updated manifest. The payload request includes a software update request.

In some embodiments, the processing circuit of the HVAC device is configured to receive a payload from the authentication server and update storage modules of the HVAC device according to the payload and prompt the user to confirm installation of the payload.

In some embodiments, the manifest indicates a location of the payload. The processing circuit of the HVAC device can be configured to retrieve the payload based on the location indicated by the manifest.

In some embodiments, the set of entitlements for the HVAC include at least an entitlement for a software operating version for the HVAC device, an entitlement for a software add-on for the HVAC device, and an entitlement that configures the HVAC device to collect data from a second device and send commands to the second device which cause the second device to affect an environmental change in the building space.

In some embodiments, the set of entitlements are entitlements for software operating versions or software add-ons for the HVAC device. The manifest can indicate that the HVAC device has a particular entitlement based on a relationship between the HVAC device and a particular group entity. In some embodiments, the particular group entity is a group of HVAC devices of a particular building and the particular entitlement is for a particular software version. The particular group entity may have the particular entitlement and the HVAC device inherits the particular entitlement from the particular group entity.

In some embodiments, the set of entitlements are entitlements for software operating versions or software add-ons for the HVAC device. The manifest can indicate that the HVAC device has an entitlement for a particular software version based on a relationship between the HVAC device and a particular group entity and a relationship between the particular group entity and a particular user entity. In some embodiments, the particular user entity is associated with a particular building and has the particular entitlement, the particular group entity is a group of HVAC devices for the particular building, and the particular entitlement is a particular software operating version. The particular group entity can inherit the particular entitlement from the user entity and the HVAC device inherits the particular entitlement from the particular group entity.

In some embodiments, the manifest includes a set of relationships between entities includes one or more relationships between group entities, user entities, and device entities.

In some embodiments, the set of entitlements for the device is based on relationships between the device and the entities and further based on the entitlements of each entity. The relationships between the device and the entities may include relationships between group entities and the device, user entities and the device, and device entities and the device.

In some embodiments, the set of entitlements for the HVAC includes at least an entitlement for a software operating version for the HVAC device, an entitlement for a software add-on for the HVAC device, and an entitlement that configures the HVAC device to collect data from a second device and send commands to the second device which cause the second device to affect an environmental change in the building space.

The relationships between the device and the entities further includes relationships between each entity and other entities. In some embodiments, the relationships between each entity and the other entities includes relationships between the group entities, the user entities, and the device entities with other group entities, other user entities, and other device entities.

In some embodiments, the processing circuit of the HVAC device is configured to send a payload request to the authentication server based on the manifest or the updated manifest. The payload request can include a software update request.

In some embodiments, the processing circuit of the HVAC device generates the encrypted dynamic key further based on a device key and a device ID value.

In some embodiments, the system includes the authentication server including a processing circuit. The processing circuit can be configured to receive the encrypted dynamic key from the HVAC device and generate the manifest stored on the device based on the encrypted dynamic key, the device key, and the device ID value. The processing circuit can be further configured to compare the generated manifest to a manifest stored on the authentication server and send the updated manifest to the HVAC device in response to determining that the generated manifest does not match the manifest stored on the authentication server.

In some embodiments, the processing circuit of the authentication server is configured to send a payload to the HVAC device in response to receiving a payload request for a specific payload and in response to the manifest stored on the authentication server indicating that the HVAC device is entitled to the requested payload.

In some embodiments, the payload request further includes a timed key. The timed key can activate the payload request for a predetermined amount of time. In some embodiments, the processing circuit of the authentication server is configured to send the payload to the device before the predefined amount of time expires.

Another implementation of the present disclosure is a method for licensing devices in a building space. The method includes generating, by an HVAC device, an encrypted dynamic key based on a manifest stored on the HVAC device. The manifest includes a set of entitlements for the HVAC device based on relationships between the device and entities. The method further includes transmitting, by the HVAC device, the stored manifest to an authentication server by sending the encrypted dynamic key to the authentication server and receiving, by the HVAC device, an updated manifest from the authentication server based on the encrypted dynamic key. The method includes sending, by the HVAC device, a payload request to the authentication server based on the updated manifest. The payload request includes a software update request.

In some embodiments, the manifest includes a set of relationships between entities including one or more relationships between group entities, user entities, and device entities.

In some embodiments, the set of entitlements for the HVAC device is based on relationships between the HVAC device and the entities and the entitlements of each entity. In some embodiments, the relationships between the HVAC device and the entities include relationships between group entities and the HVAC device, user entities and the HVAC device, and device entities and the HVAC device.

In some embodiments, the relationships between the HVAC device and the entities further include relationships between each entity and other entities. In some embodiments, the relationships between each entity and the other entities include relationships between the group entities, the user entities, and the device entities with other group entities, other user entities, and other device entities.

In some embodiments, the method further includes generating, by the HVAC device, the encrypted dynamic key further based on a device key and a device ID value.

In some embodiments, the method further includes receiving, by the authentication server, the encrypted dynamic key from the HVAC device, generating, by the authentication server, the manifest stored on the device based on the encrypted dynamic key, the device key, and the device ID value, comparing, by the authentication server, the generated manifest to a manifest stored on the authentication server, and sending, by the authentication server, the updated manifest to the HVAC device in response to determining that the generated manifest does not match the manifest stored on the authentication server.

In some embodiments, the manifest indicates a location of the payload. In some embodiments, the method further includes retrieving, by the HVAC device, the payload based on the location indicated by the manifest.

Another implementation of the present disclosure is a heating ventilation and air conditioning (HVAC) device for a building space. The device includes a processing circuit is configured to generate an encrypted dynamic key based on a manifest stored on the HVAC device. The manifest includes a set of entitlements for the HVAC device based on relationships between the HVAC device and one or more entities. The relationships between the HVAC device and the entities include relationships between one or more group entities and the HVAC device, user entities and the HVAC device, and device entities and the HVAC device. The processing circuit can be further configured to transmit the stored manifest to an authentication server by sending the encrypted dynamic key to the authentication server and receive an updated manifest from the authentication server based on the encrypted dynamic key. The processing circuit is configured to send a payload request to the authentication server based on the updated manifest. The payload request includes a software update request.

In some embodiments, the processing circuit of the HVAC device is configured to receive the payload from the authentication server and update storage modules of the HVAC device according to the payload and prompt the user to confirm installation of the payload.

In some embodiments, the relationships between the HVAC device and the entities further includes relationships between each entity and other entities. The relationships between each entity and the other entities can include relationships between the group entities, the user entities, and the device entities with other group entities, other user entities, and other device entities.

In some embodiments, the processing circuit is configured to send a payload request to an authentication server based on the manifest. The payload request can include at least one of a software update request and a software license request.

In some embodiments, the payload request further includes a timed key. The timed key can activate the payload request for a predetermined amount of time. In some embodiments, the authentication server is configured to send the payload to the device before the predefined amount of time expires.

In some embodiments, the processing circuit of the HVAC device generates the encrypted dynamic key further based on a device key and a device ID value.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 4A is a system diagram of a number of HVAC devices connected to an authentication server through a network located in the building of FIG. 1, according to some embodiments.

FIG. 7 is a chart illustrating a list of relationships and entitlements stored by the HVAC device of FIG. 5 and/or the authentication server of FIG. 6, according to some embodiments.

FIG. 11 is a diagram of a user interface for managing licenses, according to some embodiments.

DETAILED DESCRIPTION

Overview

Figure 1:
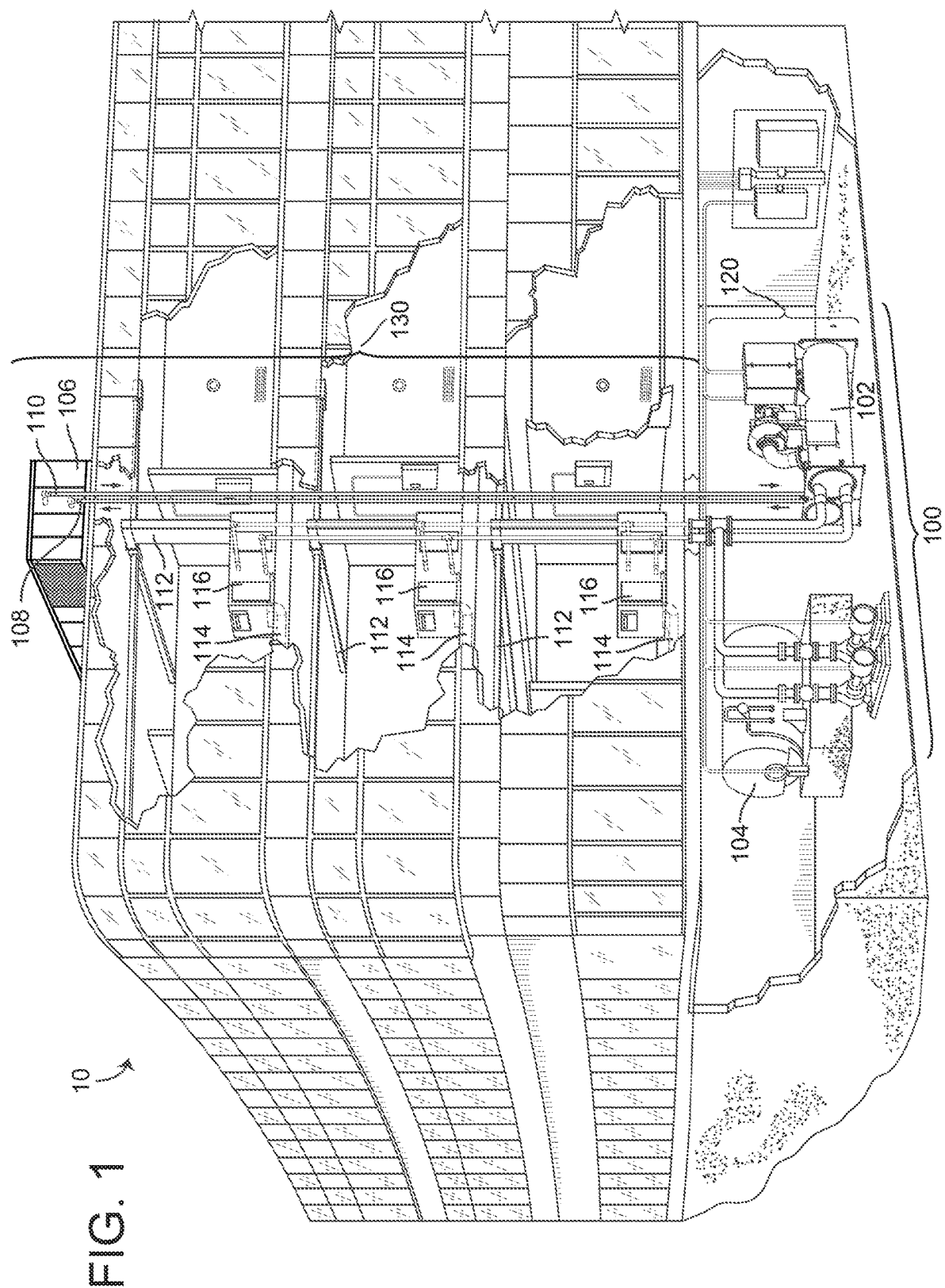
FIG. 1 is a schematic drawing of a building equipped with a HVAC system, according to an exemplary embodiment.

Referring generally to the FIGURES, systems and methods for licensing a distributed edge device such as a HVAC device is shown, according to various exemplary embodiments. Licensing a HVAC device may require various systems and methods that are not found in conventional licensing techniques due to the fact that HVAC devices may be online, offline, or may be a network hybrid; that is, a HVAC device may only be online only during provisioning and/or certain points in time. Generally, a hybrid HVAC device may be a HVAC device in which the network connectivity of the HVAC devices is not continuous, or is not guaranteed, that is, it cannot be known with a high certainty that the HVAC device will always have network connectivity. For this reason, an HVAC device may need to be configured to enforce device entitlements by itself rather than requesting permissions from a central server, where the central server is configured to enforce the entitlements of the HVAC device. In this regard, a licensing scheme for HVAC devices may be an online, offline, and hybrid licensing scheme. Further, the licensing scheme may be regarded as an on-premises, off-premises, hybrid licensing scheme since the devices may not need to always be in communication with a network, the Internet, and/or otherwise the "cloud" (e.g., a cloud based server). This may minimize the number of update clients and/or tools necessary for enforcing entitlements on the HVAC device. The licensing scheme can be used with security devices, fire protection devices, or other HVAC devices that serve as a building automation system (BAS).

The systems and methods described herein describe a "manifest" that may be used to enforce various entitlements of HVAC devices. The manifest may be metadata (e.g., a JSON blob) that is used to indicate relationships between groups, devices, and/or users, and further indicate the entitlements (e.g., licensing entitlements) for the groups, devices, and/or users. The manifest may further include file download locations for various entitlements. An "entitlement," as used herein, may refer to particular licenses to software (e.g., software operating versions, software plugins) that may have a beginning and ending licensing date, access to data stored in other devices, login access to a network service, control of other devices, various software functions and add-ons, access to a particular software version, an indication of a certain task or job for the HVAC device, and various other "entitlements" described herein. One example of an entitlement may be a configuration to control a second device and/or group of devices. The entitlement may be a particular configuration of an HVAC device that allows the HVAC device to collect data from a second device or group of devices and send commands to the second device which cause the second device to affect an environmental change in the building space. A software add-on or plugin may be a particular software function such as a scheduling add-on, a demand limiting add-on, a particular device driver and/or network driver, and/or any other add-on or plugin for an HVAC device. In some embodiments, the HVAC device makes control decisions for the second device based on the collected data. In various embodiments, the HVAC device sends the collected data to a cloud server and receives the commands for the second device from the cloud server.

The manifest may be a data structure that stores the various entitlements of an HVAC device, in addition to device information, software and applications stored on the HVAC device, tasks and jobs of the HVAC device, etc. The manifest may be stored both on the HVAC device and on an authentication server. There may be various routines which cause the HVAC device and/or the authentication server to synchronize and/or otherwise update the manifest stored on the HVAC device and the authentication server. The manifest may allow an HVAC device not connected to a network to enforce a set of entitlements.

The manifest may include various entitlements such as, but not limited to, timed access to utilize purchased software, various software plugins and/or features, authentication access to software services, access to a software download and/or software update, and/or any other feature and/or entitlement. The manifest may be structured such that the manifest not only includes various entitlements of a single device, but also includes relationships between various entities, and the entitlements of those entities. For example, the manifest for a particular HVAC device may include relationships between one or more devices, one or more groups, and/or one or more users. The devices may be various HVAC devices with specific HVAC device entitlements, the groups may be various groups such as a technician group, an administrator user group, and/or any other group which each have specific group entitlements, and the users may be various users (e.g., John Smith, Technician A), each having specific user entitlements. The HVAC device storing the particular manifest, may include all of the entitlements of the entities (e.g., the devices, the groups, the users). In this regard, the manifest of a particular device may include the entitlements of the particular device, the relationships between the particular device and various entities, and the entitlements of the various entities.

The entitlements of a manifest may be additive. An example of additive entitlements is as follows. A manifest for a first device includes a relationship between group A and the first device. Group A may have entitlement A. Group A may have a relationship between group A and group B. Group B may have entitlement B. The first device may also include a relationship with device C. Device C may have entitlement C. Finally, the first device may have an entitlement D. The manifest for the first device may indicate that the first device includes entitlements A, B, C, and D based on the various relationships between the entities (e.g., group A, group B, device C). The first device may be configured to enforce entitlements A, B, C and D based on the manifest.

Another example is as follows. In a building, all building controllers may have access to Software A. In this regard, a group (e.g., Building Controller Group) may exist with the entitlement that every member of Building Controller Group has an entitlement to Software A. A manifest of one building controller of the Building Controller Group, Building Controller B, may indicate that Building Controller B has a relationship with the Building Controller Group and thus, Building Controller B may inherit the entitlement of the Building Controller Group, that is, the entitlement to Software A.

In various embodiments, the manifest for an HVAC device is encrypted before it is sent to an authentication server and/or is encrypted by the authentication server, before it is sent to the HVAC device. Both the HVAC device and the authentication server can be configured to generate a "dynamic key." The dynamic key may be an encrypted version of the manifest for the HVAC device and may be encrypted with a device key and a device ID. In this regard, an HVAC device may encrypt the manifest stored on the HVAC device with a device key and a device ID specific to the HVAC device. The manifest may be sent to the authentication server (e.g., a type of assertion to the authentication server). The authentication server may decrypt the dynamic key with copies of the device key and the device ID stored by the authentication server. The decrypted dynamic key, the manifest, may be analyzed to determine if the manifest is correct and/or otherwise up to date. If the authentication server determines that the manifest needs to be updated, an updated manifest may be encrypted with the device ID and the device key (e.g., the copies of the device ID and the device key) and sent to the HVAC device.

Building Management System and HVAC System

Figure 2:
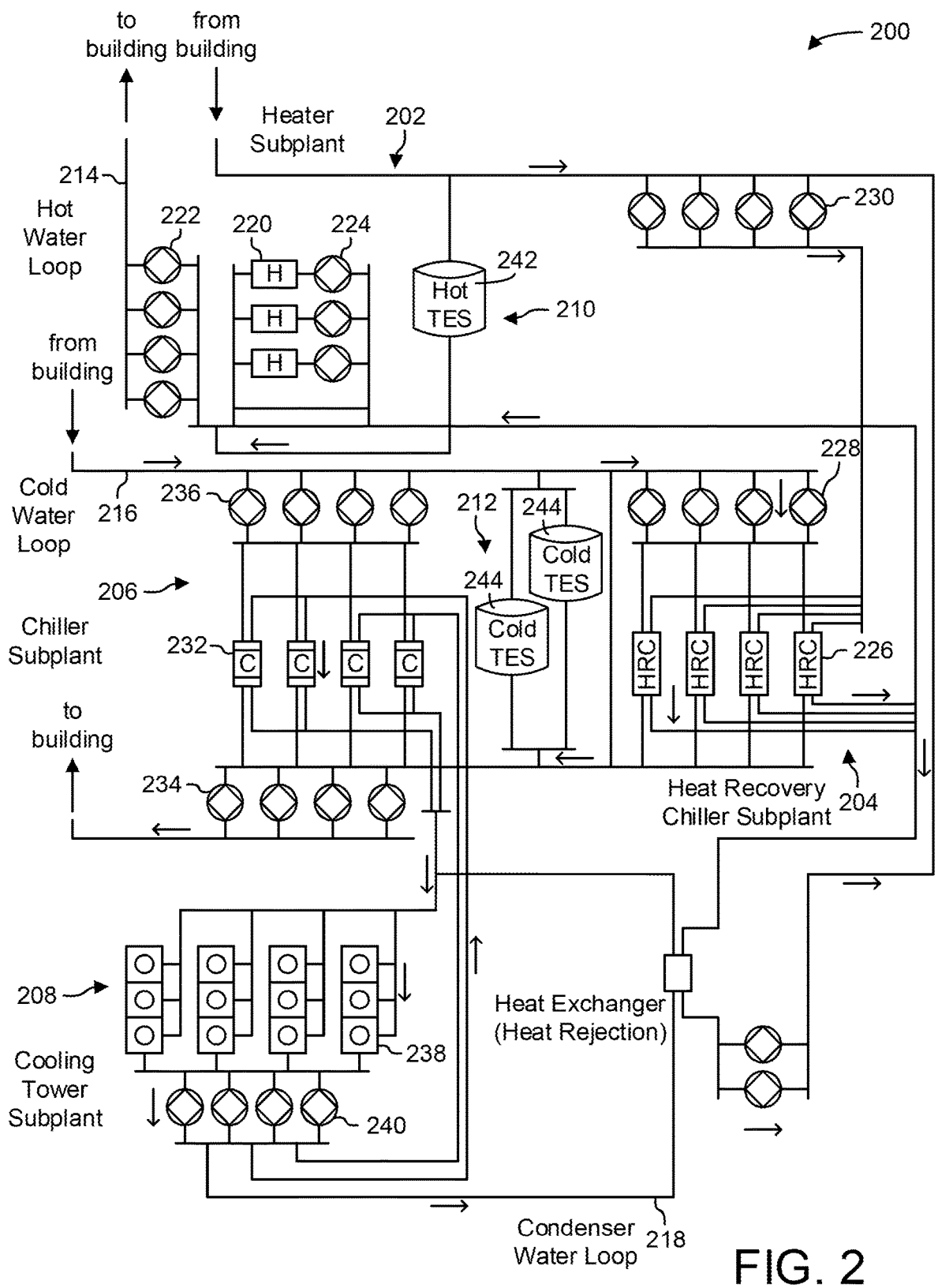
FIG. 2 is a block diagram of a waterside system that may be used in conjunction with the building of FIG. 1, according to an exemplary embodiment.
Figure 3:
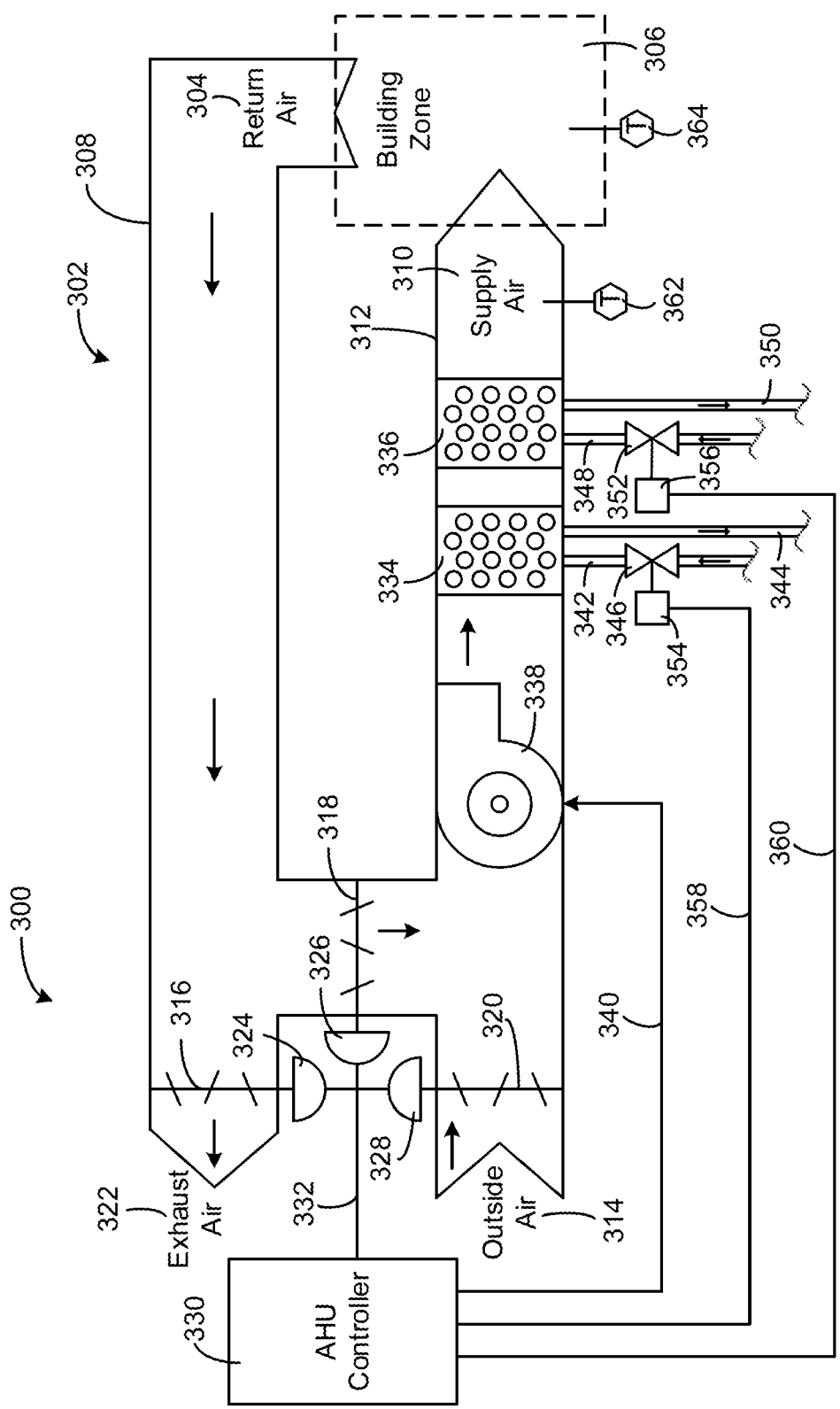
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314.

AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Systems and Methods for HVAC Device Licensing

Referring now to FIG. 4A, a block diagram of a communications system 400 is shown, according to an exemplary embodiment. System 400 can be implemented in a building (e.g., building 10) and is shown to include one or more HVAC devices 402, an authentication server 404, and a user device 406 all communicating with a network 408. HVAC devices 402 may include an actuator 410, a damper 412, a chiller 414, a heater 416, a rooftop unit (RTU) 418, an air handling unit (AHU) 420, a gateway 422 and/or any other type of equipment or device (e.g., fans, pumps, valves, etc.) that can be installed within a building (e.g., building 10). For example, HVAC devices 402 may be one or more BMS devices, as described with reference to FIGS. 1-3. In some embodiments, HVAC devices 402 are thermostats, dampers, valves, VA variable air volume boxes, security devices, lighting devices, emergency equipment, fire protection devices, or other IoT devices. HVAC devices 402 can be configured to cause an environmental change in a building and/or zone. In various embodiments, HVAC devices 402 can cause other devices to cause an environmental change in a building and/or zone. For example, HVAC devices 402 may individually and/or as a group be configured to heat, cool, humidify, dehumidify, etc. a building (e.g., building 10), and/or a zone of the building.

Although the present specification is described primarily with reference to HVAC equipment, it should be understood that the systems and methods described herein may be applicable to a wide variety of building equipment and non-building equipment other types of connected devices (e.g., HVAC equipment, smart lighting systems, mobile phones, elevator systems, fire safety systems, smart street lamps, cars, smart televisions, etc.) with embedded intelligence and communication capabilities.

HVAC device(s) 402 can be configured to communicate with each other and/or with remote services (e.g., remote monitoring and analytics services, cloud-based control services, etc.). In some embodiments, HVAC device(s) 402 are configured to have ubiquitous connectivity (i.e., are always connected). In other embodiments, the HVAC devices 402 are connected for periods of time and/or are never connected. In some embodiments, HVAC devices 402 may each their own processing and analytics capabilities. HVAC devices 402 are managed in the cloud (e.g., authentication server 404) through various software applications and/or analytics models built to control HVAC devices 402, in some embodiments. As such, a field/supervisory controller or building automation system may not be required to control HVAC devices 402. For example, a smart actuator that has built in position feedback, a processor, and a communication network, can provide a cost-effective solution for performing local decision making functions. A series of smart actuators and dampers that work together can provide completely autonomous manipulation of a building.

HVAC device(s) 402 may communicate (e.g., point-to-point communications) with each other using any of a variety of communications protocols. In some embodiments, smart connected HVAC device(s) 402 communicate with each other wirelessly using a wireless communications protocol (e.g. WiFi, Bluetooth, 3G/4G, 802.15.4, Zigbee, LoRa, etc.). The particular communications protocol used by HVAC device(s) 402 can be dependent upon the power requirements, bandwidth requirements, and/or the existing infrastructure within the building in which smart connected HVAC device(s) 402 are installed. In some embodiments, HVAC device(s) 402 communicate with each other using a proprietary building equipment protocol (e.g., BACNet, Zigbee, Modbus, a field bus, etc.) to move data between various devices. In order to build applications on top of those protocols, the protocols may be converted into the Internet Protocol (IP). In some embodiments, a communications gateway (e.g., gateway 422) is used for such a conversion.

In some embodiments, only a portion of HVAC device(s) 402 (e.g., gateway 422) communicate with an outside network (e.g., via a cellular network, a wide-area network (WAN), the Internet, etc.). Data (e.g., a dynamic key, an updated manifest, a payload, etc.) may be exchanged between HVAC device(s) 402, and then transmitted to other HVAC devices 402 or the outside network by a subset of HVAC device(s) 402. The types of data transmitted by HVAC device(s) 402 may include, for example, measurements recorded by sensors integrated with HVAC device(s) 402, device status information, diagnostic information, configuration information, device identity information, a software version, a hardware version, or any other information related to HVAC device(s) 402, or the operation thereof. In order for the data to be consumed by the various software applications, a contextual protocol (e.g., RESTful API, CoAP, HTTP, AMQP, MQTT) can be used to provide contextual information on the data. One or more APIs can be used to share data with the external network using a clean abstraction.

In some embodiments, HVAC device(s) 402 are shown to send and receive data (e.g., a dynamic key, a payload request, a payload, an updated manifest, etc.) via a network 408 and/or a gateway 422. In some embodiments, the updated manifest is a relationship between various entities (e.g., devices, groups, users) and entitlements (e.g., control actions, software licenses, etc.). In some embodiments, gateway 422 can be used to connect legacy and new equipment (e.g., temperature sensors, actuators, cooling or heating devices, industrial robots, personal health monitoring devices, etc.), to get data from legacy and/or new equipment, and, in return, to control them based on the instructions or analytical results received from control devices (e.g., HVAC controllers, thermostats, AHU 420).

Gateway 422 can provide network security, access control, and unique addresses of legacy devices endpoints for remote access and protocol mediation services. In some embodiments, gateway 422 is a general-purpose gateway solution made by any of a variety of hardware manufacturers (e.g., Intel, FreeScale, Dell, Texas Instruments, etc.). In other embodiments, gateway 422 is a Network Control Engine (NCE), a Network Automation Engine (NAE) and/or MAP gateway used specifically to connect building automation systems and smart equipment. Gateway 422 may use various Internet-based protocols (e.g., CoAP, XMPP, AMQP, MQTT, etc.) or web-based common data exchange (e.g., HTTP RESTful APIs) to translate communications from a building automation system protocol to an Internet protocol. In some embodiments, gateway 422 can be configured to communicate with authentication server 404 to maintain a manifest as described with further reference to FIGS. 5-8. In various embodiments, gateway 422 can store update various permissions on HVAC devices 402 based on a manifest stored on gateway 422.

HVAC device 402 may describe each, a set of, and/or a particular HVAC device of HVAC devices 402. In some embodiments, HVAC device 402 is configured to generate a dynamic key based on a manifest stored on HVAC device 402, a device key stored on HVAC device 402 that may be unique to HVAC device 402 and may be private, and a device ID which may be a public value. In some embodiments, the manifest contains all the relationships between users, groups, devices, and a particular HVAC device 402 and the entitlements which each group device, and user may be associated with. Once generated, the dynamic key may be sent to authentication server 404 via network 408. Authentication server 404 may reply to the dynamic key by sending an updated manifest to HVAC device 402. Further, HVAC device 402 can be configured to request a payload (e.g., a software update request, a software license request, and an operating feature request, etc.) that HVAC device 402 is entitled based on a set of entitlements determined by the manifest stored on HVAC device 402. In various embodiments, authentication server 404 may assert a manifest to HVAC device 402. As used herein, "assert" may refer to sending, transmitting, and/or otherwise communicating data. In this regard, HVAC device 402 can be configured to update the manifest stored on HVAC device 402.

In some embodiments, network 408 may include the Internet and/or other types of data networks, such as a local area network (LAN), a wide area network (WAN), a cellular network, a satellite network, or any other type of data network or combination thereof. Network 408 may include any number of computing devices (e.g., computers, servers, routers, network switches, etc.) configured to transmit, receive, or relay data. Network 408 may further include any number of hardwired and/or wireless connections. For example, HVAC device(s) 402 may communicate wirelessly (e.g., using a WiFi or cellular radio, etc.) with a transceiver that is hardwired (e.g., via a fiber optic cable, Ethernet, a CAT5 cable, etc.) to a computing device of network 408.

Network 408 may include services that facilitate managing the wireless and/or wired communication with HVAC device(s) 402. Network vendors may include, for example, cellular telecommunications providers (e.g., Verizon, T-Mobile, AT&T, etc.) as well as internet service providers. Communications via network 408 may leverage enterprise contracts and partnerships to optimize the cost of data transmission. Many network carriers provide a secure connection option as a part of premium services. However, a similar degree of network security can be achieved via employing trusted platform modules in HVAC device(s) 402 and using encrypted messaging. HVAC devices 402 may use advanced message queuing protocol (AMQP) via an Internet-based secure transport. In various embodiments, each device and/or a portion of the devices communicating over network 408 use transport layer security (TLS), secure sockets layer (SSL), and/or any other cryptographic protocol to ensure integrity and/or security of the messages sent over network 408.

Still referring to FIG. 4A, an authentication server 404 is shown to receive a dynamic key and a payload request via network 408. Further, authentication server 404 is shown to send a payload and an updated manifest to network 408. In some embodiments, authentication server 404 is located in building 10 or may be located remotely and may communicate with HVAC device(s) 402 and user device 406 via the Internet or any other network (e.g., network 408).

In some embodiments, authentication server 404 is configured to decode a dynamic key received from at least one of HVAC device(s) 402 and/or user device 406. Once decoded, the dynamic key may identify a manifest stored on HVAC device 402 and/or user device 406. Authentication server 404 can be configured to search a database (e.g., a device registry and/or a license registry) of various device manifests linked to various devices (e.g., HVAC device(s) 402) and determine if the manifest sent (e.g., asserted) by the HVAC device 402 to authentication server 404 is correct, up-to-date, and/or otherwise synchronized. In some embodiments, authentication server 404 identifies that the manifest stored on HVAC device 402 and/or user device 406 is not correct and/or up-to-date. In this case, authentication server 404 can be configured to transmit an updated manifest to HVAC device 402. In some embodiments, the updated manifest is encrypted so that only HVAC device 402 can interpret that data. This may allow for security so that other devices such as other HVAC devices 402 (e.g., actuator 410, heater 416, chiller, RTU 418, etc.) may pass the updated manifest to the destination device without being able to decode the manifest.

In some embodiments, authentication server 404 is configured to receive a payload request from at least one of HVAC device(s) 402 and/or user device 406. In some embodiments, the payload request is a request for a software update, a software license, a software functionality, and/or any other request. Authentication server 404 may send a reply to the payload request by sending the requested payload to HVAC device(s) 402 and/or user device 406 based on the manifest associated with HVAC device(s) 402 and/or user device 406. The manifest may indicate that HVAC device(s) 402 and/or user device 406 may or may not have an entitlement to the payload (e.g., may or may not have purchased particular piece of software, may or may not have made monthly payments for a feature, etc.) Authentication server 404 is configured to respond accordingly to each request for a payload. For example, if user B has not made an annual payment for a certain software functionality for his actuator 410, yet actuator 410 requests a payload, authentication server 404 may not send the requested payload. In some embodiments, the payload request is an automatic request sent by the user device 406 and/or HVAC device(s) 402 without the intervention of a user. In various embodiments, each payload request is encrypted. Encrypting the payload request verifies the integrity of the payload request. If the payload request is damaged in any way or otherwise corrupted while being transmitted from one device to another, the decrypted payload request will not be recognizable and/or in a useful format.

Authentication server 404 is shown to include a device registry 425 and license registry 427. Device registry 425 may include a registry of all the HVAC device(s) 402 registered with authentication server 404. In some embodiments, device registry 425 records connection states and/or capabilities of HVAC devices 402. Further, authentication server 404 may link various users and/or user profiles to various devices (e.g., a manifest) that may be recorded in device registry 425. In some embodiments, authentication server 404 can be configured to send commands to HVAC devices 402 and/or receive data from HVAC devices 402. In this regard, authentication server 404 can be configured to monitor and/or record the received data. In some embodiments, the monitored and/or recorded data is metadata associated with the HVAC devices 402. In some embodiments, authentication server 404 (e.g., license registry 427) can be configured to maintain a list of permissions and associations between users, devices, organizations, etc. as described with further reference to FIGS. 7-8.

In some embodiments, authentication server 404 includes a database and/or databases (e.g., device registry 425, license register 427, etc.) that authentication server 404 uses to store data. In some embodiments, authentication server 404 is a physical computer system and/or controller that is located on the same premises (e.g., in the same building) as HVAC devices 402 and/or instantiated as a single computing system. The databases may be a key-value database, a non-relational database (e.g., NoSQL), a relational database (RDB), a postgreSQL database, and/or any other type or combination of database types when authentication server 404 is located on the same building premises as HVAC device 402. In some embodiments, authentication server 404 is cloud based (e.g., not located on the same premises as HVAC devices 402). In this regard, authentication server 404 may include an AZURE® Active Directory, an AZURE® IoT Hub, an AZURE® Document Database, an AZURE® Tables, and/or any other mechanism for storing data. In some embodiments, the AZURE® IoT Hub acts as a message transport layer to facilitate communication from a device (e.g., HVAC device 402) to a cloud (e.g., authentication server 404) (e.g., telemetry). In various embodiments, the AZUREx IoT Hub acts as a message transport layer to facilitate communication from the cloud (e.g., authentication server 404) to the device (e.g., HVAC device 402). In some embodiments, the communication from the cloud to the device includes various command messages. In further embodiments, the AZURE® IoT Hub may include a device registry (e.g., device registry 425) that tracks various connection states and various capabilities of various devices (e.g., HVAC devices 402).

Authentication server 404 is shown to include access portal 424. Access portal 424 may be accessible via a user device 406 and/or any other computing device. In some embodiments, access portal 424 may include a user interface (UI) that can be accessed via a user device (e.g., user device 406). In some embodiments, access portal 424 includes multiple user interfaces (e.g., user interface for a user, user interface for manufacturing and/or $3^{rd}$ party). In various embodiments, the user interface(s) may include various logos and/or specific color themes. In some embodiments, user device 406 connects with authentications server 404 via the Internet. Access portal 424 may allow user device 406 to manage a profile (e.g., a user profile, a device profile, a company profile, a campus profile, etc.). In some embodiments, access portal 424 may allow user device 406 to add devices to a profile and/or remove devices from the profile.

Further, access portal 424 may allow user device 406 to make various changes to the devices associated with the profile (e.g., data stored in device registry 425 and/or license registry 427). For example, access portal 424 may allow user device 406 to change, set and/or generate new device keys, device IDs, SKU values, and/or any other indicator and/or data element associated with various devices (e.g., HVAC device 402) and/or associated with the profile. In some embodiments, the device ID can be changed by user device 406 if an HVAC device 402 has been replaced. In some embodiments a user may view various devices, device types (e.g., METASYS® devices, data collectors, etc.), and various device connections associated with the profile, view the status of the device, view the software installed and/or available for the devices (e.g., a developer software version, an alpha software version, a beta software version, a release software version, etc.), etc. Further access portal 424 and/or authentication server 404 may update (e.g., periodically update) the software version indication based on the software currently running on HVAC device 402.

In some embodiments, authentication server 404 can be configured to allow user device 406 to manage various licenses. In some embodiments, the licenses are associated with one or more profiles and/or devices. In some embodiments, access portal 424 can be configured to update a manifest for a device based on various licenses associated with the profile. In some embodiments, access portal 424 can be configured to allow user device 406 to add new and/or edit current licenses (e.g., entitlements). In this regard, user device 406 can cause access portal 424 to extend, revoke and/or assign a license to a particular profile, a user, a device, etc. In addition to allowing user device 406 to adjust and/or create new licenses, access portal 424 can be configured to display the current status of each license by sending the status to user device 406.

Authentication server 404 can be configured to register a particular HVAC device 402 and can be configured to store registration information in device registry 425, license registry 427, and/or any other data storage available to authentication server 404. In some embodiments, authentication server 404 registers the particular HVAC device 402 with a specific user and/or a specific set of permissions and/or entitlements. However, if the HVAC device 402 is not registered with authentication server 404, the HVAC device 402 may continue to function. In response to being properly configured and/or registered, authentication server 404 may update the configuration of HVAC device 402. In this regard, a particular product version and/or version identifier, device information, job and task definitions, license capabilities, product versions available for download, software updates etc. may be downloaded and/or installed by HVAC device 402. In some embodiments, the data is downloaded from authentication server 404 based on the configuration (e.g., manifest) received from authentication server 404. The information download may be based on information stored in device registry 425 and/or license registry 427. Further, based on the configuration, HVAC device 402 can be configured to execute various jobs (e.g., uploading a diagnostic file to authentication server 404), using a security API to store licensing information to a file, etc.

In some embodiments, authentication server 404 can be configured to authenticate various users and/or devices (e.g., HVAC devices 402 and/or user device 406) and give the user and/or device various levels of access (e.g., scope). In this regard, the various users and/or devices may be authenticated via various tokens (e.g., a dynamic key, a device ID, a device key, an device ID, a manifest, etc.) that may be generated and/or issued to the devices by authentication server 404. In some embodiments, authentication server 404 is integrated with and/or allows a user and/or device to authenticate with a third party identification service (e.g., MICROSOFT®, GOOGLE®, FACEBOOK, etc.). In some embodiments, authentication server 404 allows for various types of authentication. In some embodiments, the authentication is a hybrid flow. This may be the authentication that occurs via a login form. In some embodiments, a user logs in with the login form via a user name (e.g., Organization ID, domain name, etc.) and a password. In various embodiments, the authentication is a resource owner flow. The resource owner flow may allow a user to authenticate with authentication server 404 without the use of a user login page. Further, authentication server may allow a device to authenticate via a client credentials flow. In this embodiment, a device may authenticate with authentication server 404 without the intervention of a user (e.g., via a dynamic key).

Access portal 424 can be configured to create, store, and/or update various relationships between users, groups, devices, environments, software versions, etc. In some embodiments, access portal 424 can access and/or update license information stored in license registry 427. These relationships are described with further reference to FIG. 7. Access portal 424 can be configured to allow user device 406 to add, remove, associate, and/or edit users, groups, organizations, companies, devices, etc. In some embodiments, adding, removing, and/or associating the users, groups, organizations, companies, and devices allows for various relationships between entities to be created. Further, access portal 424 can be configured to allow user device 406 to add, remove, and/or edit various permissions (e.g., entitlements) corresponding to the various relationships. The relationships between permissions users, groups, devices, environments, and software versions are described with further reference to FIG. 8.

Still referring to FIG. 4A, a user device 406 is shown to communicate via network 408 to at least one of authentication server 404 and HVAC device(s) 402. User device 406 may be any portable and/or stationary computing device. In some embodiments, the user device 406 is a smartphone, a tablet, a laptop, a desktop computer and/or any other computing device that may be communicatively coupled to the internet and/or network 408. In some embodiments, user device 406 can be configured to perform some and/or all of the functionality of authentication server 404. In this regard, if user device 406 can be configured to perform software updates and/or manifest updates with HVAC device(s) 402 and/or any other functionality as described with respect to authentication server 404. In this regard, a user may receive a software package, a software update, a manifest update and/or any other data from authentication server 404, which can then be used to update HVAC devices 402. In this regard, HVAC devices 402 can receives updates even if HVAC devices 402 are not connected to authentication server 404 and/or the Internet. Further, user device 406 may be and/or run a client update utility as described with further reference to FIG. 10.

In some embodiments, user device 406 may send a dynamic key to at least one of authentication server 404 and HVAC device(s) 402. In some embodiments, user device 406 can be configured to receive an updated manifest from authentication server 404. In some embodiments, user device 406 may communicate with and/or control HVAC device(s) 402 based on a manifest stored on user device 406. The manifest stored on user device 406 may give the user device 406 certain entitlements and allow user device 406 to control HVAC device(s) 402 based on the entitlements. This may allow user device 406 to bypass a conventional login screen and/or may remove the requirement of asking for additional authentication when user device 406 may attempt to perform a control action (e.g., change a screen background, adjust a temperature setpoint, perform a full system shut down) that the user device 406 is not entitled to.

Figure 4B:
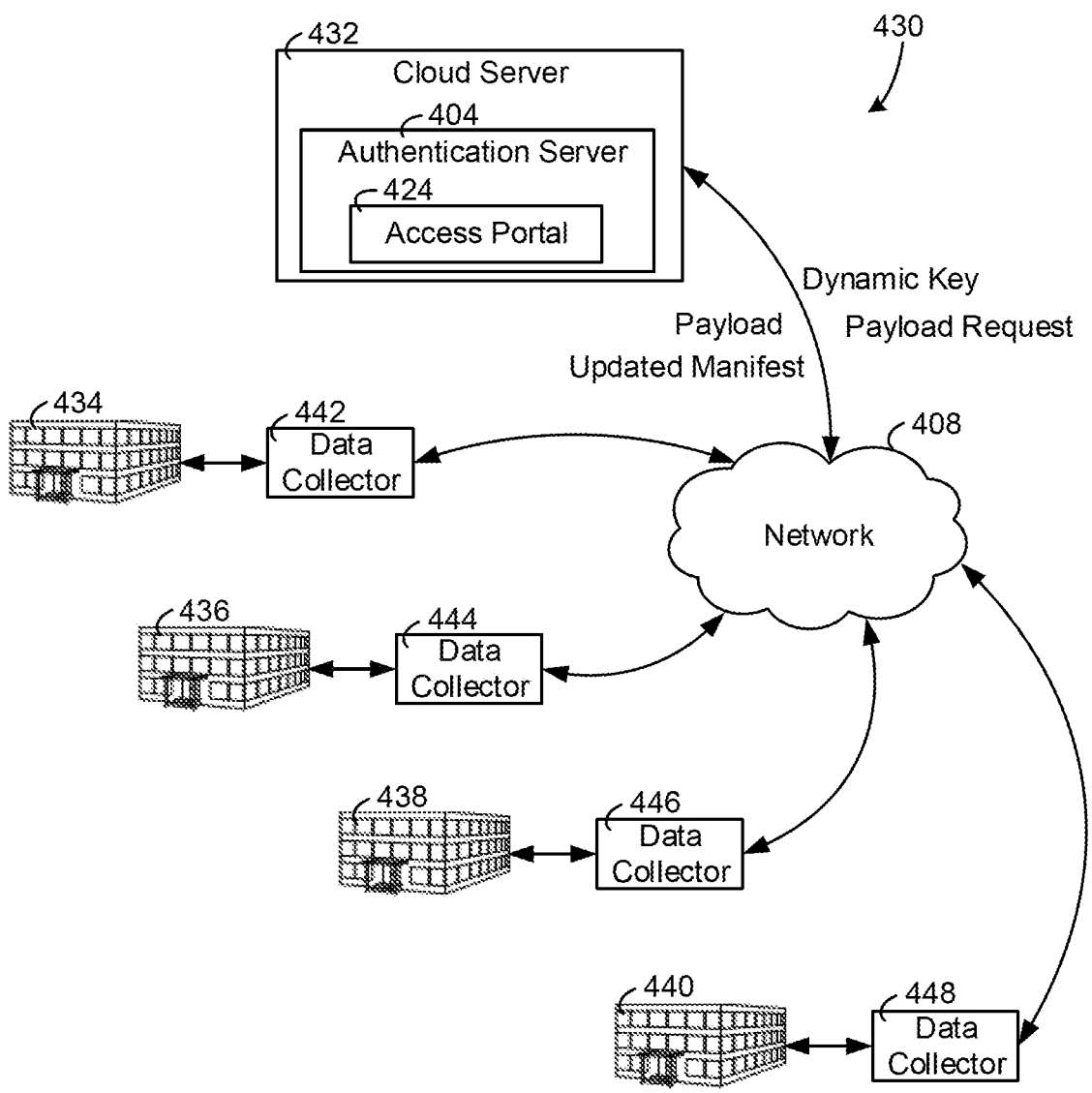
FIG. 4B is a diagram of multiple buildings communicating to a cloud server via data collectors, according to some embodiments.

Referring now to FIG. 4B, a system 430 including multiple buildings connected to a cloud server via data collectors is shown, according to an exemplary embodiment. System 430 is shown to include multiple buildings 434, 436, 438, and 440. Buildings 434-440 may be the same and/or similar to building 10. In some embodiments, the buildings are all owned by a single company and/or may be located on a single campus, on multiple campuses, in multiple states, and/or in multiple countries. Each building 434-440 is shown to have a data collector, data collectors 442-448. Data collectors 442-448 may be controllers, gateways (e.g., gateway 422), computer systems, and/or any other device that can collect data for a building and push the data to a server. In some embodiments, buildings 434-440 may have one or more data collectors. Local regulations of data security and/or encryption can be met by each building 434-440 and/or data collector 442-448 based on the location (e.g., country, state, district) that each building 434-440 and/or data collector 442-448 are located. A customer associated with one or more of buildings 434-440 should have a provision to decide that their data when stored in cloud, the data center should be in their respective country. For e.g. Spain (branch) only wants data to be stored in Spain data centers. This should be a provision while doing application configuration.

Cloud server 432 may store data collected from buildings 434-440 via data collectors 442-448. Cloud server 432 is shown to include authentication server 404. In this regard, cloud server 432 can perform software licensing for devices in various buildings, in various states, and/or in various countries. As shown in FIG. 4B, cloud server 432 sends a payload and an updated manifest to the buildings 434-440. Further, cloud server 432 is shown to receive a dynamic key and payload request from buildings 434-440. In this regard, each of buildings 434-440 may include devices similar to HVAC devices 402 that may generate information such as a dynamic key and a payload request and receive information such as a payload and an updated manifest. In this regard, licensing can be consolidated for multiple buildings owned by a single customer. For example, if a particular customer owns buildings 434 and 436 and sets, via cloud server 432, that each thermostat of building 434 and 436 should be entitled to a particular software version, authentication server 404 may communicate with the thermostats of buildings 434 and 436 to license the particular software version for the thermostats.

In some embodiments, one or more of data collectors 442-448 are "on-premises" collectors. These collectors may run building software (e.g., METASYS®) and may run "data collector" software. In some embodiments, one or more of data collectors 442-448 may be "hosted." In this regard, the data collectors 442-448 may only run the data collector software while cloud server 432 may run building software. For this reason, cloud server 432 can be configured to perform the control functions of "on-premises" collectors.

When the data collectors 442-448 are hosted, data collectors 442-448 may be "lightweight" data collectors. These data collectors may have low processing power, low memory, and/or low data storage. In some embodiments, hosted data collectors may have a higher maximum point list than the on-premises collectors. The data collectors may push collected data to the cloud (e.g., to a cloud server). Critical operations for buildings 434-440 such as data backups, user management may all be done on cloud server 432. In various embodiments, one of data collectors 442-448 may store collected data locally in a building server and/or use a local building server as a cloud server. This may accommodate multiple buildings at a particular site (e.g., a university campus). In some embodiments, instead of storing data in cloud storage (e.g., MICROSOFT AZURE®) the collected data may be stored in a local building server. In some embodiments, a particular data collector of the building may act as the local building server. However, a user may be able to access the locally stored data via the cloud even though the data is not automatically pushed to a cloud server.

In some instances, when Internet connection for one of buildings 434-440 is interrupted, the data collectors for the building with an Internet outage may buffer data until Internet connection is reestablished. Then, after the Internet connect is reestablished, data collectors 442-448 may push the data to a cloud server and/or reconcile collected data. In some embodiments, communication between data collectors 442-448 and the cloud application is performed via a secure channel. In case of any connection issues between one of data collectors 442-448 and cloud server 432, connection information can be logged by both the collectors 442-448 as well on cloud server 432.

Cloud server 432 can maintain transmission health information for each of data collectors 442-448 and update the information periodically. In some embodiments, to optimize Internet data usage, data collectors 442 may collect data for buildings 434-440 and transmit the data to cloud server 432 in batches. A user may modify the size and interval of the batches of data via data collectors 442-448 and/or cloud server 432.

Cloud server 432 may partition data received from data collectors 442-448 based on customer. For example, building 434 and data collector 442 may be owned by customer A while buildings 436-440 and data collectors 444-448 may be owned by customer B. Both customer A and B can log into cloud server 432 via a URL and/or portal and see data relating to their respective equipment. The information may include software versions, customer name, serial numbers for data collectors 442-448, software versions for data collectors 442-448, license status for collectors 442-448 (e.g., via access portal 424), branch information, ability to provision devices and/or collectors of buildings 434-440 (e.g., upgrade software, downgrade software, renew software licenses, disable software licenses, etc.). In various embodiments, cloud server 432 may generate reports based on the information. Cloud server 432 may send the reports to a user (e.g., via an email).

Figure 5:
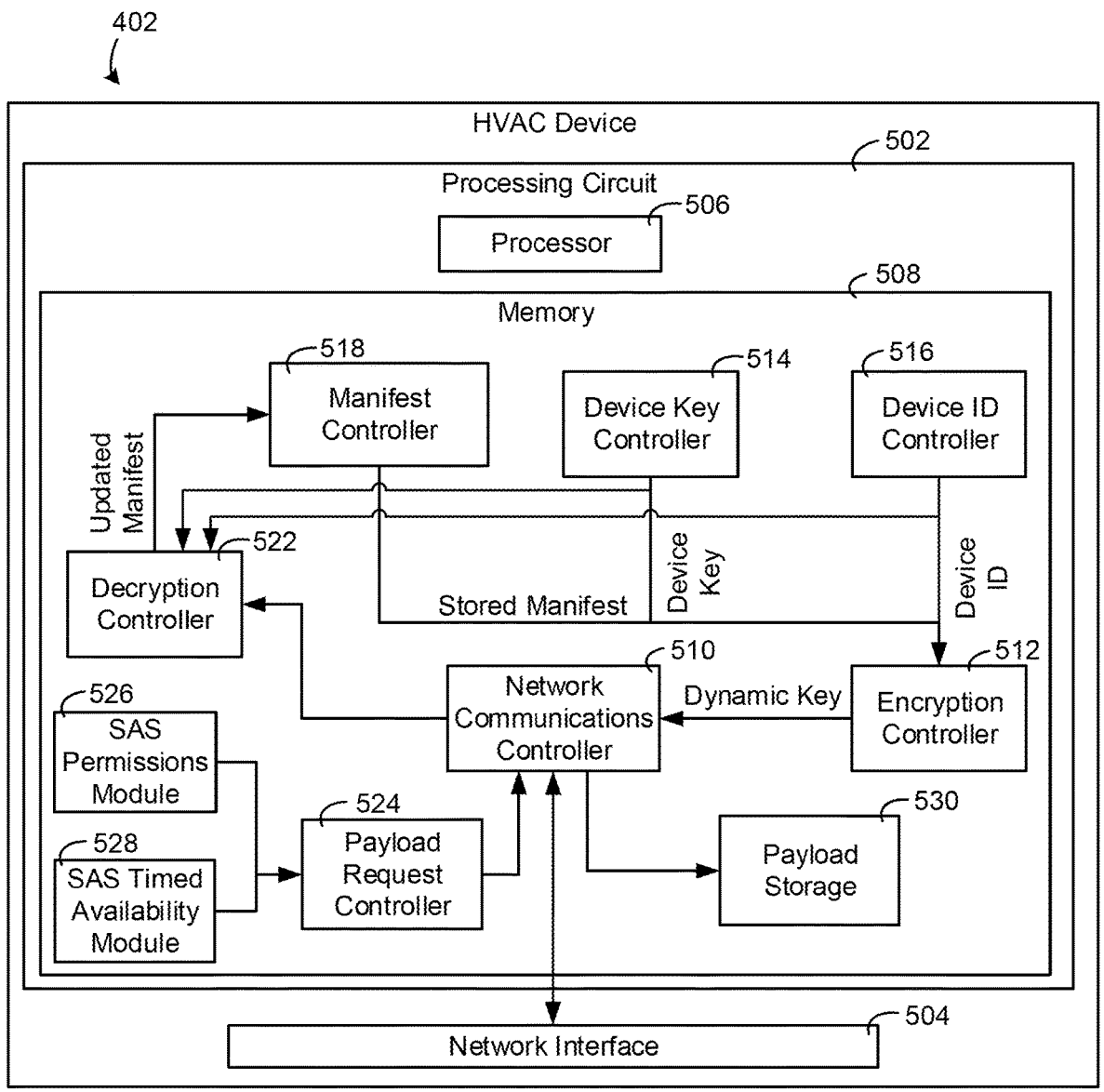
FIG. 5 is a diagram of an HVAC device of FIG. 4A in greater detail, according to some embodiments.

Referring now to FIG. 5, HVAC device 402 is shown in greater detail, according to an exemplary embodiment. It should be understood FIG. 5 may also describe user device 406, gateway 422, as well as one, all, none, and/or a portion of HVAC devices 402, and/or any other computing device. HVAC device 402 may include a processing circuit 502 and a network interface 504. Processing circuit 502 may include a processor 506 and memory 508. Processor 506 may be a general purpose or specific purpose processors, an application specific integrated circuits (ASICs), one or more field programmable gate arrays (FPGAs), a group of processing components, or other suitable processing components. The processor can be configured to execute computer code or instructions stored in memory or received from other computer readable media (e.g., CDROM, network storage, a remote server, etc.).

Memory 508 can include random access memory (RAM), read-only memory (ROM), hard drive storage, temporary storage, non-volatile memory, flash memory, optical memory, or any other suitable memory for storing software objects and/or computer instructions. The memory can include database components, object code components, script components, or any other type of information structure for supporting the various activities and information structures described in the present disclosure.

Network interface 504 can be configured to communicate with a network (e.g., network 408) wirelessly and/or through hardwired means. Network interface 504 can be configured to communicate with a local area network (LAN), a wide area network (WAN), a cellular network, a satellite network, a radio network, or any other type of data network or combination thereof. Network interface 504 may communicate wirelessly (e.g., using a WiFi or cellular radio, etc.) with a transceiver that is hardwired to HVAC device 402 (e.g., via a fiber optic cable, a CATS cable, etc.). In this regard, network interface 504 can be configured to facilitate communication between HVAC device 402, other HVAC devices 402, gateway 422, user device 406, authentication server 404, network 408, and/or any other device and/or network.

Memory 508 is shown include a network communications controller 510, an encryption controller 512, a device key controller 514, a device ID controller 516, and a manifest controller 518, among other elements. In some embodiments, network communications controller 510 is configured to send and receive data over network interface 504. In some embodiments, network communications controller 510 is configured to cause network interface 504 to send and receive data over local area networks (LANs), wide area networks (WANs), cellular networks, satellite networks, wireless networks, wired networks, and/or any other type of data network or combination thereof. Further, network communications controller 510 can be configured to cause network interface 504 to communicate wirelessly (e.g., WiFi, Bluetooth, Zigbee, LTE, 3G, etc.)

Encryption controller 512 can be configured to generate a dynamic key by encrypting a manifest stored in manifest controller 518 with a device key stored in device key controller 514 and a device ID stored in device ID controller 516. In some embodiments, processing circuit 502 and/or device key controller 514 and device ID controller 516 are and/or include a trusted platform module (TPM). In this regard, device key controller 514 and/or device ID controller 516 can be configured securely store and/or retrieve the device key and the device ID from a TPM. If processing circuit 502, device key controller 514, and/or device ID controller 516 are not TMPs, processing circuit 502 and/or device key controller 514 and device ID controller 516 may have a secure storage location for the device key and the device ID. In some embodiments, a user may view the device key stored by device key controller 514 via a user interface of HVAC device 402. In some embodiments, a user may view, set, and/or change the device ID stored by device ID controller 516 via a user interface of HVAC device 402 and/or with a provisioning device (e.g., user device 406).

Various encryption methods may be used to perform the encryption in encryption controller 512. In some embodiments, the encryption method is one of and/or a combination of Triple DES, RSA, Blowfish, Twofish, AES, device key encryption, private key encryption, public key encryption, seed-key encryption, a proprietary encryption method, and/or any other method that can be used to encrypt the stored manifest with the device key and the device ID. In some embodiments, a seed-key encryption method is used to perform the encryption of the stored manifest. The device key may be the crypto key in the seed-key encryption method while the device ID may be the seed in the seed-key encryption method.

In some embodiments, encryption controller 512 can be configured to cause the dynamic key to include a particular token and/or identifier of HVAC device 402. For example, dynamic key 510 may be an encrypted form of the stored manifest that is encrypted with the device key and the device ID. However, the dynamic key 510 may also include the device ID itself. In this regard, when the authentication server 404 receives the dynamic key from HVAC device 402, the authentication server 404 can use the device ID to determine which device has sent the dynamic key, can use the device ID to lookup values (e.g., the device key) that the authentication server 404 may use to decrypt the dynamic key, and/or may use the device ID to identify what the current manifest stored by the authentication is so that the manifest encrypted in the dynamic key can be compared to the current manifest.

Decryption controller 522 can be configured to receive an updated manifest from an authentication server 404 via network communications controller 504. The updated manifest may be encrypted on authentication server 404 and may be transmitted to the decryption controller 522 via network 408. In some embodiments, the decryption controller is configured to decode the updated manifest using decryption methods associated with encryption methods such as DES, RAS, Blowfish, Twofish, AES, device key encryption, private key encryption, public key encryption, seed-key encryption, a proprietary encryption methods, and/or any other method of encryption. In some embodiments, decryption controller 522 is configured to decrypt the encrypted updated manifest when the manifest is encrypted with seed-key encryption. In some embodiments, the decryption controller is configured to use the device ID and/or the device key stored by device key controller 514 and device ID controller 516 to decrypt the updated manifest. In some embodiments, decryption controller 522 is configured to use a device key and/or an device ID associated with authentication server 404 to decrypt the updated manifest.

Still referring to FIG. 5, memory 508 is shown to include payload request controller 524, secured access signature (SAS) permissions module 526, and SAS timed availability module 528. In various embodiments, a SAS may be used to transmit a representation of a key (e.g., device key, device ID, stored manifest, etc.) and/or a message signed with the key from one device to another rather than sending (i.e., revealing) the key and/or value itself. Sending a key representation and/or message signed with a key may add another layer of security when transmitting data across network 408. In various embodiments, an SAS provides limited and/or full access to resources without sending (i.e., revealing) device key values. Payload request controller 524 can be configured to determine a time at which to send a payload request to an authentication server (e.g., authentication server 404). Payload request controller 524 may send a payload request periodically (e.g., every day, week, month, etc.) based on a timer and/or real time clock.

In some embodiments, payload storage 530 stores various software updates, software versions, update files, etc. that are not installed on HVAC device 402. In this regard, payload storage 530 may act as an offline repository for software and/or any other data. Payload storage 530 may mirror any software updates and/or downloads available on the authentication server 404 locally on HVAC device 402. For this reason, payload request controller 524 may retrieve software downloads and/or software packages from payload storage 530 rather than communicating with authentication server 404 based on various entitlements stored in manifest controller 518.

Payload request controller 524 can be configured to determine if HVAC device 402 needs to request a payload from authentication server 404. If payload request controller 524 determines that the manifest stored in manifest controller 518 contains entitlements which HVAC device 402 does not utilize, payload request controller 524 may send a payload request to authentication server 404 for the entitlement. In further embodiments, if payload request controller 524 determines that HVAC device 402 currently utilizes an entitlement which the manifest stored by manifest controller 518 indicates that HVAC device 402 should not have, payload request controller 524 can be configured to delete and/or replace the entitlement. For example, if the manifest indicates that HVAC device 402 should have a particular software version that HVAC device 402 does not have, payload request controller 524 may send authentication server 404 a request for the software. Further, if payload request controller 524 determines that HVAC device 402 has a software version that the manifest stored by manifest controller 518 does not indicate that HVAC device 402 should have, payload request controller 524 may delete and/or replace the software version with a software version that HVAC device 402 does have an entitlement for.

In some embodiments, payload request controller 524 can be configured to retrieve a payload from a file location (e.g., a file path, a URL, etc.) as indicated by a manifest stored by manifest controller 518. In some embodiments, the manifest stored by manifest controller 518 indicates a file location for a payload and/or a plurality of payloads. The number of file locations may depend on the number of entitlements that HVAC device 402 may have. If the manifest indicates that HVAC device 402 is entitled to a specific piece of software, the manifest may include the file location for that specific piece of software. In this regard, rather than sending a request to authentication server 404 for the payload, payload request controller 524 can be configured to retrieve the payload based on the file destination. Payload request controller 524 can be configured to install the payload e.g., install a piece of software or a software updated, based on the payload received from the file location.

In some embodiments, the SAS permissions module stores certain permissions for the HVAC device. In some embodiments, these permissions may include read access, write access, and/or any other type of access. In some embodiments, the permissions may also include permissions to read and/or write certain information in authentication server 404. In some embodiments, the information which HVAC device 402 can request to read and/or write is defined by certain entitlements identified by the manifest stored in manifest controller 518. In some embodiments, SAS timed availability module 528 may determine a length of time during which the request for a payload is active. In some embodiments, the timed availability may include at least one of a start time and an end time. The start time and end time may define a window in which the payload request is active. If the payload request is active (e.g., within the defined time window), authentication server 404 may be able to respond to the payload request. However, if the payload request is inactive or expired, the authentication server 404 may ignore the payload request.

Payload request controller 524 can be configured to send a payload request to authentication server 404. In some embodiments, payload request controller 524 sends the payload request based on one or more entitlements indicated by the manifest stored in manifest controller 518. In some embodiments, payload request controller 524 can be configured to send a payload request when a user prompts the payload request module via a user interface and/or a device connected to HVAC device 402 (e.g., through network interface 504) that causes payload request controller 524 to send a payload request. In some embodiments, payload request controller 524 sends the payload request to authentication server 404 along with permissions stored in the SAS permissions module 526 and/or a timed availability indicated generated by SAS timed availability module 528.

In response to receiving the payload from authentication server 404, network communications controller 510 can be configured to store and/or update the payload stored in payload storage 530. In some embodiments, payload storage 530 is configured to run an update and/or install the payload when the payload is a software update, a software license, and/or a software add-on.

Still referring to FIG. 5, manifest controller 518 can be configured to store a manifest. The manifest may include a set of relationships between HVAC device 402 and various entities and/or the various entities and other entities. Further, the manifest may indicate a set of entitlements for the HVAC device 402 and/or entitlements of the various entities and/or other entities. The set of entitlements may allow an HVAC device 402 and/or a user of HVAC device 402 to perform certain actions with HVAC device 402 such as adjusting a temperature setpoint, turning a connected system on and/or off, running certain pieces of software, requesting software updates, etc. In some embodiments, the entity is at least one of a group (e.g., a technician group, a home residents group, a "Kids" group, a "Mom and Dad" group, etc.), a user (e.g., Technician Bill, Dad, User A, User B, etc.), and a device (Mobile Device 1, Smartphone A, Computer 4, Actuator 9, etc.). In some embodiments, the manifest includes certain entitlements associated with each entity (e.g., group, user, device, etc.). These entitlements may be additive in nature based on relationships between various entities. For example, if User 718 has entitlement A and device 2 has entitlement B and entitlement C. If user 718 and device 2 have a relationship, User 718 may have entitlements A, B and C.

Figure 6:
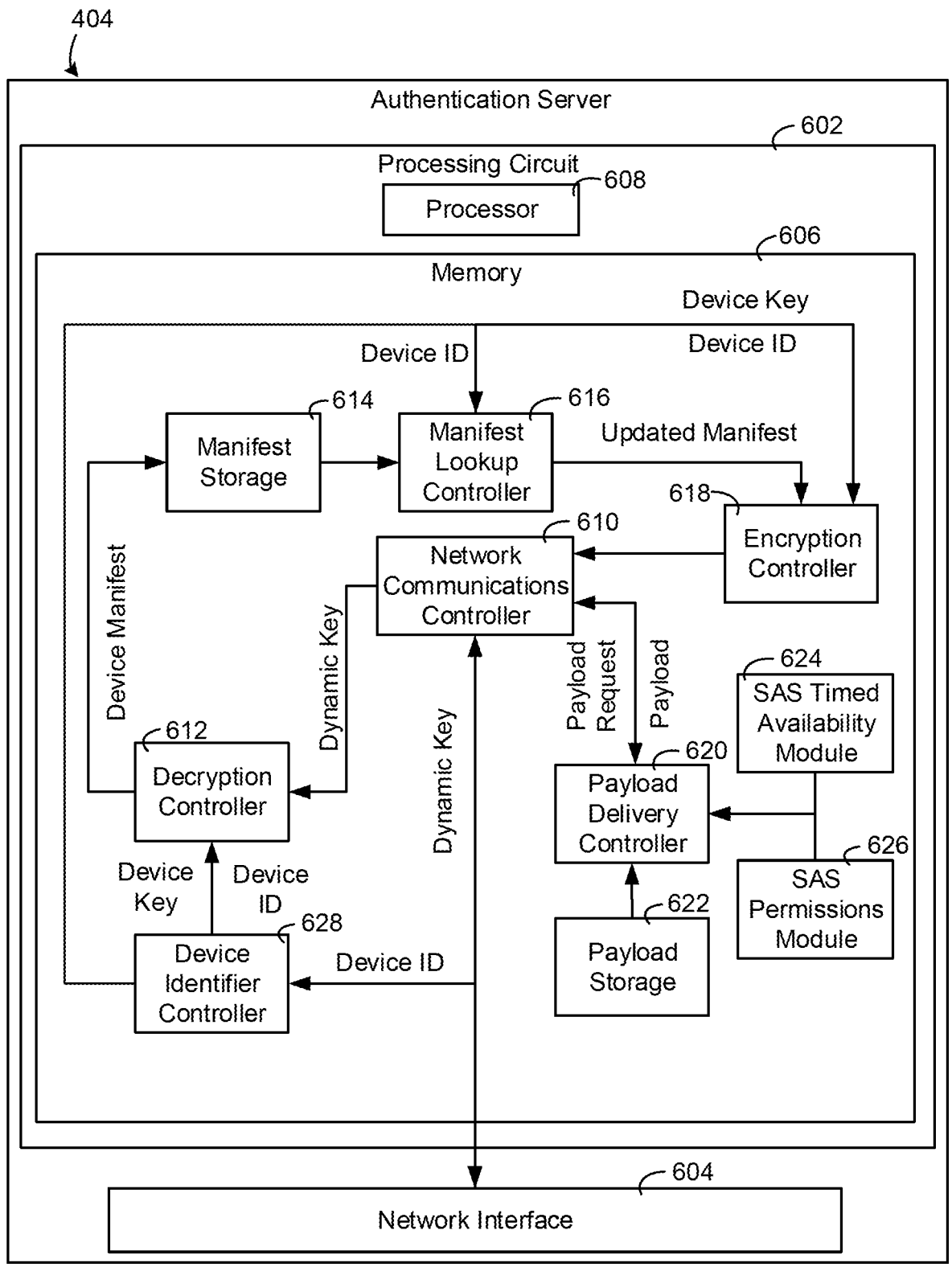
FIG. 6 is a diagram of the authentication server of FIG. 4A in greater detail, according to some embodiments.

Referring now to FIG. 6, authentication server 404 is shown in greater detail, according to some embodiment. Authentication server 404 is shown to include a processing circuit 602 and a network interface 604. Processing circuit 602 is shown to include memory 606 and processor 608. Processing circuit 602 may include a processor 608 and memory 606. Processor 608 may be general purpose or specific purpose processors, an application specific integrated circuits (ASICs), one or more field programmable gate arrays (FPGAs), a group of processing components, or other suitable processing components. Processor 608 can be configured to execute computer code or instructions stored in memory or received from other computer readable media (e.g., CDROM, network storage, a remote server, etc.).

Memory 606 can include random access memory (RAM), read-only memory (ROM), hard drive storage, temporary storage, non-volatile memory, flash memory, optical memory, or any other suitable memory for storing software objects and/or computer instructions. Memory 606 can include database components, object code components, script components, or any other type of information structure for supporting the various activities and information structures described in the present disclosure.

Network interface 604 can be configured to communicate with a network (e.g., network 408) wirelessly or through hardwired means. Network interface 604 can be configured to communicate with a local area network (LAN), a wide area network (WAN), a cellular network, a satellite network, a wireless network, or any other type of data network or combination thereof. Network interface 604 may communicate wirelessly (e.g., using a WiFi or cellular radio) to network 408. Network interface 604 may facilitate communication with user device 406, HVAC device 402, and/or gateway 422.

In some embodiments, network communications controller 610 is configured to send and receive data over network interface 604. In some embodiments, network communications controller 610 is configured to cause network interface 604 to send and receive data over local area networks (LANs), wide area networks (WANs), cellular networks, satellite networks, radio networks, or any other type of data network or combination thereof. Further, network communications controller 610 can be configured to cause network interface 604 to communicate wirelessly (e.g., WiFi, Bluetooth, Zigbee, LTE, 3G, etc.).

Memory 606 is shown to include a decryption controller 612, manifest storage 614, manifest lookup controller 616, encryption controller 618, payload delivery controller 620, payload storage 622, SAS timed availability module 624, SAS permissions module 626, and device identifier controller 628.

Decryption controller 612 can be configured to receive a dynamic key from network communications controller 610. The dynamic key may be encrypted on HVAC device 402, user device 406, and/or any other device and may be transmitted to decryption controller 612 via network 408. In some embodiments, decryption controller 612 is configured to decode the dynamic key using decryption methods associated with encryption methods DES, RAS, Blowfish, Twofish, AES, device key encryption, private key encryption, public key encryption, seed-key encryption, a proprietary encryption method, and/or any other method of encryption. In some embodiments, decryption controller 612 is configured to decrypt the dynamic key when the dynamic key is encrypted with seed-key encryption. In some embodiments, the decryption controller uses the device ID, the device key, and/or a manifest all of which are associated with the device that originally generated the dynamic key to decrypt the dynamic key.

In some embodiments, decryption controller 612 can be configured to retrieve and/or receive the device ID and the device key from device identifier controller 628. In this regard, device identifier controller 628 can be configured to identify the device that transmitted the dynamic key and provide decryption controller 612 with a device key and device ID associated with the identified device. In some embodiments, device identifier controller 628 identifies the device that transmitted the dynamic key via a token included in the transmission (e.g., the device ID). In this regard, device identifier controller 628 can be configured to store associations between the device ID and the device key.

In some embodiments, processing circuit 602 and/or device identifier controller 628 are and/or include a trusted platform module (TPM). In this regard, device identifier controller 628 can be configured to securely store and/or retrieve the device key and the device ID from a TPM. If processing circuit 502 and/or device identifier controller 628 do not include TMPs, processing circuit 602 and/or device identifier controller 628 may have a secure storage location for the device key and the device ID.

Manifest storage 614 can be configured to store the asserted manifest (e.g., the device manifest) that is generated once the dynamic key is decoded. In some embodiments, manifest storage 614 is configured to temporarily store the manifest. In some embodiments, the manifest storage contains a log of all past manifests decrypted from the dynamic key based on device ID, device key, and/or any other token or identifier.

Manifest lookup controller 616 is configured to receive the decrypted device manifest from manifest storage 614. In some embodiments, manifest lookup controller 616 contains the most recent and/or current manifest associated with the device that generated the dynamic key. Manifest lookup controller 616 can be configured to identify the current manifest based on the device ID. In this regard, manifest lookup controller 616 can be configured to receive the device ID from device identifier controller 628.

In some embodiments, manifest lookup controller 616 can be configured to generate an updated manifest. In some embodiments, manifest lookup controller 616 can generate an updated manifest based on entitlements of an HVAC device (e.g., an HVAC device identified by a device ID), relationships of the HVAC device with other entities, etc.

In some embodiments, the manifest lookup controller 616 is configured to compare the manifest decrypted using the dynamic key to the current manifest. If the manifest lookup controller 616 determines that the current manifest associated with the device and the manifest decoded using the dynamic key do not match, the manifest lookup controller 616 may send the current manifest (e.g., an updated manifest) to the encryption controller 618 so that the current manifest can be transmitted to the device to update the manifest stored on the device. The manifest transmitted by the network interface may be referred to as the updated manifest. In some embodiments, manifest lookup controller 616 is configured to send the updated manifest directly to network communications controller 610 without encrypting the manifest. In various embodiments, network communications controller 610 may utilize TLS, SSL, and/or any other cryptographic protocol to encrypt the manifest.

In some embodiments, manifest lookup controller 616 can be configured to assert the current manifest to HVAC device 402. In this regard, manifest lookup controller 616 can be configured to send (e.g., assert) the current manifest to HVAC device 402. HVAC device 402 can be configured to determine if the manifest stored on HVAC device 402 is correct. HVAC device 402 can further be configured to receive the asserted manifest from the authentication server 404 and compare the asserted manifest from authentication server 404 to a manifest stored on HVAC device 402. If the manifest stored on HVAC device 402 does not match the manifest asserted by authentication server 404, HVAC device 402 can be configured to update and/or replace the manifest stored on HVAC device 402 with the asserted manifest from the authentication server 404. The various encryption and decryption methods described with reference to encryption controller 618 and decryption controller 612, in addition to the encryption and decryption methods described with reference to encryption controller 512 and decryption controller 522 as described with reference to FIG. 5, may be used to assert a manifest to HVAC device 402.

Encryption controller 618 can be configured to generate an encrypted updated manifest by encrypting the updated manifest received from manifest lookup controller 616 with a device key and a device ID associated with HVAC device 402 and/or authentication server 404. Encryption controller 618 can be configured to receive the device ID and the device key from device identifier controller 628. In some embodiments, the device ID and the device key are retrieved by device identifier controller 628 and provided to encryption controller 618. Various encryption methods may be used to perform the encryption in encryption controller 618. In some embodiments, the encryption method is one or more of Triple DES, RSA, Blowfish, Twofish, AES, private key encryption, public key encryption, seed-key encryption, a proprietary encryption method, and/or any other method that can be used to encrypt the updated manifest with the device key and the device ID. In some embodiments, a seed-key encryption method is used to perform the encryption of the updated manifest. The device key may be the crypto key in the seed-key encryption while the device ID may be used as a seed in an encryption method (e.g., seed-key encryption).

In some embodiments, payload delivery controller 620 is configured to receive payload requests from a device (e.g., HVAC device(s) 402). In some embodiments, the payload request includes timed availability and/or various permissions. In some embodiments, payload delivery controller 620 is configured to respond to the payload requested in a predefined amount of time. The predefined amount of time may be defined by the timed availability received in the payload request. In this regard, payload delivery controller 620 can be configured to respond to the payload request before the time in which the payload request is active (e.g., the timed availability) expires.

In some embodiments, payload delivery controller 620 is configured to determine if the device requesting the payload has the appropriate entitlements to receive the payload. Entitlements may be determined based on SAS permissions received from the device as part of the payload request and/or a manifest for HVAC device 402 stored in manifest storage 614 and/or manifest lookup controller 616. In some embodiments, the payload delivery controller 620 is configured to send a payload from payload storage 622 along with a timed availability from SAS timed availability module 624 and SAS permissions from SAS permissions module 626. In various embodiments, payload delivery controller 620 determines if HVAC device 402 is entitled to a particular payload based on a manifest for HVAC device 402 that may be stored in manifest storage 614.

In some embodiments, payload delivery controller 620 can be configured to store file locations for payloads (e.g., software updates, software add-ons, etc.). The locations may be file destinations on a local server, a web address of a file (e.g., a URL), and/or any other type of address. Payload delivery controller can provide the file locations to manifest lookup controller 616. In this regard, the manifest stored, retrieve, and/or generated by manifest lookup controller 616 (e.g., updated manifest) may include the file location for a particular payload that an HVAC device may be entitled to. In this regard, the manifest may indicate that an HVAC device is entitled to a particular payload and may further indicate the file location from which the HVAC device can retrieve the payload.

Referring now to FIG. 7, a Table set 700 is shown that identifies various relationships and entitlements for a manifest, according to an exemplary embodiment. In some embodiments, the relationships in Table set 700 are stored in and/or make up a manifest as described with reference to FIGS. 4-6. The manifest (e.g., a representation of Table set 700) may be stored in a data structure on HVAC device 402, authentication server 404, and/or user device 406. Various entities (e.g., groups, users, devices, etc.) of the manifest may have relationships with a particular device (e.g., HVAC device 402), with each other, and/or with other entities (e.g., other groups, other users, and other devices). Table set 700 includes relationships between groups, users, and devices in three sub-tables, Table A, Table B, Table C. Table set 700 includes Table D and Table E that illustrate relationships between software versions, environments, and devices. Table set 700 is further shown to include Table F which indicates the various entitlements which various entities may have.

When one entity has a relationship with another entity, each entity may inherit some and/or all entitlements of the other entity. In some embodiments, each entitlement of an entity and/or the entity as a whole may have a permission indicator (e.g., an identifier and/or data element). The permissions indicator may allow for an entitlement to be shared with all other entities having a relationship to the entity that includes the entitlement, to only certain entities and/or certain types of entities (e.g., users, groups, devices, etc.), or may not be shared at all. This may prevent certain entitlements from being shared to specific users, groups, or devices that should not have the certain entitlement. For example, an administrator group may have a relationship with a non-administrator group. The permissions identifiers of the administrator group and the non-administrator group may be such that the administrator group inherits all of the entitlements of the non-administrator group while the non-administrator group inherits none of the entitlements of the administrator group.

In Table A, three groups are identified, Group A 712, Group B 714, and Group C 716. In some embodiments, there may be any number of groups. The groups may be generated by an authentication server (e.g., authentication server 404) and/or a device (e.g., HVAC device 402). Groups may be generated for certain sets of individuals. For example, there may be a "Parents" group or a "Kids" group on a thermostat in a household. Group A 712 has a relationship with User 1 718, Group B 714 has a relationship with User 1 718, and Group C 716 has a relationship with User 2 720.

In some embodiments, the relationships between the groups and users may indicate that any entitlements a group has is shared with the user and vice versa. In other embodiments, only certain entitlements and/or no entitlements are shared. In various embodiments, groups may be associated with other groups. For example, Group A 712 may be associated with Group B 714. Group A 712 may have (e.g., receive, inherit) all, none, and/or a portion of the entitlements of Group B 714. In various embodiments, users may be associated with other users. For example, User 1 718 may be associated with User 2 720. User 1 718 may have (e.g., receive, inherit) all, none, and/or a portion of the entitlements of User 2 720.

Table B is shown to illustrate relationships between groups and devices. In Table B, Group A 712 is shown to have a relationship with Device 1 722, Group B 714 is shown to have a relationship with Device 3 726, and Group C 716 is shown to have a relationship with Device 3 726. In some embodiments, there may be any number of groups and/or devices. The devices may be HVAC device(s) 402, user devices (e.g., user device 406), and/or any other device. In some embodiments, any entitlement that a group has is shared with the device it has a relationship with, and vice versa. In other embodiments, only certain entitlements and/or no entitlements are shared. In various embodiments, devices may be associated with other devices. For example, Device 1 722 may be associated with Device 2 724. Device 1 722 may have (e.g., receive, inherit) all and/or a portion of the entitlements of Device 2 724.

Table C is shown to illustrate relationships between devices and users. Device 1 722 is shown to have a relationship with User 1 718, Device 2 724 is shown to have a relationship with User 2 720, and Device 3 726 is shown to have a relationship with User 3 728. In some embodiments, there may be any number of users and/or devices. In some embodiments, any entitlement that a device has is shared with the user it has a relationship with, and vice versa. In other embodiments, only certain entitlements and/or no entitlements are shared.

Table D is shown to illustrate relationships between software versions and environments (e.g., deployment environments). In various embodiments, environment A 736, environment B 738, and environment C 740 may be manufacturing environments, home environments, office environments and/or any other environment. In Table D, software version 1 730 has a relationship with environment A 736. Software version 2 732 has a relationship with environment B 738 and software version 3 734 has a relationship with environment C 740. In various embodiments, devices in each environment are entitled to a certain software version. In some embodiments, software version 1, software version 2, and software version 3 may be applicable and/or required for a specific environment and/or multiple specific environments. Software version 1 730, software version 2 732, and software version 3 734 may be entitlements and/or may be an entity with specific entitlements. For example, software version 1 730 may be an entitlement for a particular environment. However, software version 1 730 may also be a software entity which has various entitlements such as entitlements to one or more pieces of software corresponding to software version 1 730 and/or one or more software features corresponding to software version 1 730.

Table E is shown to illustrate relationships between devices and environments. The environments may be the same environments as in Table D. Device 1 may be linked to environment A, device 2 may be linked to environment B, and device 3 may be linked to environment C. The environments in which device 1, device 2, and device 3 are deployed may define what software version(s) device 1, device 2, and device 3 are entitled to. In a further example, since device 1 722 has a relationship with environment A 736, device 1 722 may be entitled to software version 1 730. In some embodiments, a device may update its software based on the relationships between environments, devices, and software versions. For example, if device 1 722 is associated with environment A 736, it may automatically download and install software version 1 730 from a server (e.g., authentication server 404).

Table F is shown to illustrate the entitlements which entities may have. In Table F, a relationship between entities and entitlements is shown. The entities in Table F are Device 1 722, Group A 712, and User 3 728 as further described with reference to FIG. 7. The entities in Table F are not limited to devices, groups, and users and may be any other type of entity. Each entity is associated with a particular entitlement. In some embodiments, there are any number of entities and/or entitlements. In Table F, Device 1 722 is shown to be associated with entitlement A 742, Group A 712 is shown to be associated with entitlement B 744, and User 3 728 is shown to be associated with entitlement C 746. Since Device 1 722 has a relationship with Group A 712 as further described in Table B, Device 1 have receive entitlements A and B. Since User 3 728 has a relationship with Device 3 726 as further described in Table C. Since user 3 728 has entitlement C 746, Device 3 726 may receive entitlement C 746.

The entitlements may be shared across Groups, Devices, and Users in an additive manner. In this regard, whenever there is a relationship between a Group, a Device, and/or a User, an entitlement may be shared. For example, a particular group may inherit all, some, and/or none the entitlements of the devices and users it has a relationship with. However, the entitlements and/or the particular group and/or any other entity may have a permissions indicator (e.g., an identifier and/or data element) which may cause an entitlement to be shared to all other entities that have a relationship to the group, to only certain entities and/or certain types of entities (e.g., certain users, groups, devices, etc.), or not shared at all. This may prevent certain entitlements of the group from being shared to users, devices, or other groups that should not have the certain entitlement.

In some embodiments, the entity-entitlement Table F, parts of Table set 700, and/or Table set 700 in its entirety is stored by HVAC devices 402 and/or authentication server 404. In some embodiments, the entity-entitlement Table F may be stored as a data element (e.g., a JSON blob) and may use various methods for distributing the data element (e.g., via a content delivery network (CDN)). The data element may store information, such as information regarding a software license. The information may include the date the software is licensed until (e.g., an end date), the various abilities that the software may be entitled to, an activation date, a user email address, a product family, a type (e.g., standard, enterprise, advanced), number of points allowed, number of meters allowed, number and/or type of equipment allowed, and/or any other information.

In one example of the relationships described in FIG. 7, a manifest of HVAC device 402 indicates a relationships between HVAC device 402 and a group entity and an inheritance of a particular entitlement from the group entity. The group entity may be specific to a particular building (e.g., building 10) and/or set of buildings (e.g., buildings 434-440). An owner of the particular building or set of buildings may wish for every HVAC device in the building or set of buildings to have a particular software version. For example, the owner of the building may have five controllers or gateways (e.g., 422) in the building. The owner may wish that all five of the devices be licensed to run the same software. Thus, the particular group may be a building device group. Each device of the building or set of buildings may inherit the entitlement for the particular software version from the group entity. In this regard, HVAC device 402 may inherit the entitlement for the particular software version from the group entity which it has a relationship with.

In another example, a manifest of HVAC device 402 indicates that HVAC device 402 has an entitlement for a particular software version based on a relationship between HVAC device 402 and a particular group entity and a relationship between the particular group entity and a particular user entity. The group entity may be a group of devices for a particular building (e.g., a group of controllers, gateways, or thermostats). The user entity may be an owner of the particular building. The user entity may have an entitlement for the particular software operating version. The relationship between the particular user entity and the group entity may indicate that all devices that have a relationship with the group entity may inherit the entitlement for the particular software version.

Figure 8:
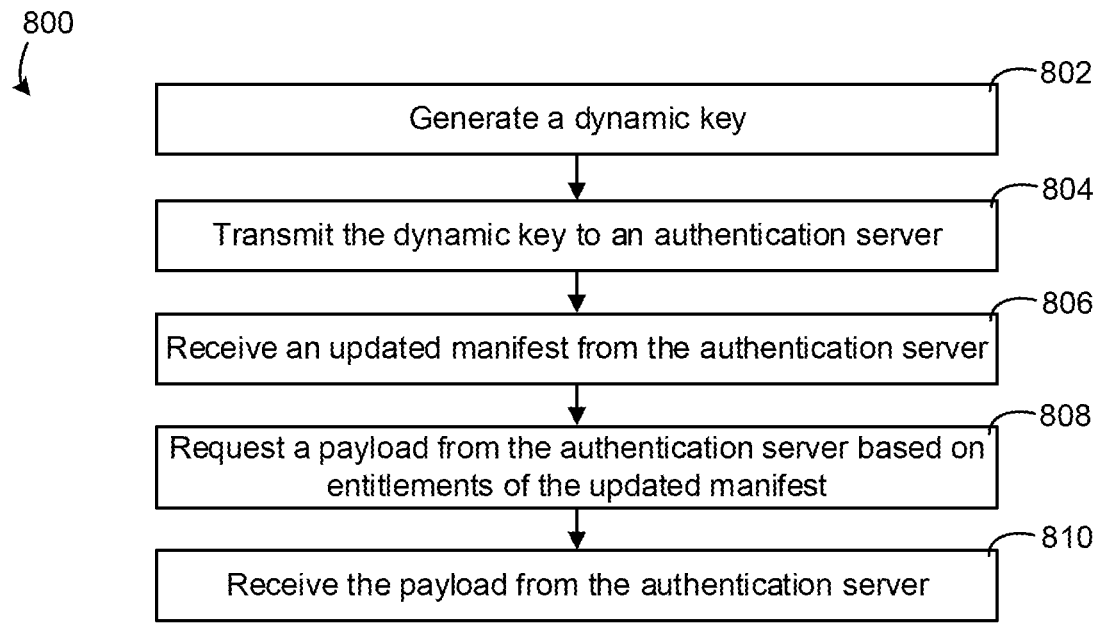
FIG. 8 is a flow diagram illustrating a process for updating a manifest and receiving a payload that can be performed by the HVAC devices of FIG. 4A, according to some embodiments.

Referring now to FIG. 8, a process 800 for updating a manifest and receiving a payload using an HVAC device and an authentication server is shown, according to some embodiments. In some embodiments, HVAC device 402, user device 406, and/or authentication server 404, as described with reference to FIGS. 4-5, are configured to perform process 800. In some embodiments, when the HVAC device (e.g., HVAC device 402) is online, the authentication server 404 acts as the authentication server. In other embodiments, when the HVAC device is offline, user device 406 acts as the authentication server. This can allow for either a user using a technician device (e.g., user device 406) and/or a cloud server (e.g., authentication server 404) to perform process 800 based on the network status of HVAC device 402. In this regard, user device 406 may include some and/or all of the functionality of authentication server 404.

At 802, HVAC device 402 generates a dynamic key. In some embodiments, the dynamic key is generated based on a manifest, a device key, and a device ID of HVAC device 402. Encryption controller 512 of HVAC device 402 may receive a device ID from device ID controller 516, a device key from device key controller 514, and/or a stored manifest from manifest controller 518. In this regard, encryption controller 512 may use one or more various encryption methods to generate the dynamic key based on the device ID, the device key, and/or the stored manifest. In some embodiments, a seed-key encryption method is used to encrypt the dynamic key with the device key and the device ID. In some embodiments, the device ID is the seed and the device key is the crypto key or vice versa.

At 804, the HVAC device 402 transmits the dynamic key to authentication server 404. In some embodiments, HVAC device 402 transmits the dynamic key via network communications controller 510 and network 408. Authentication server 404 can decode the dynamic key and send an updated manifest to the HVAC device 402. In some embodiments, authentication server 404 determines if the manifest of the dynamic key does not match a current manifest stored by authentication server 404. Authentication server 404 sends the updated manifest to HVAC device 402 in response to determining that the manifest received from HVAC device 402 does not match the manifest stored on authentication server 404 (step 806). Based on the updated manifest, HVAC device 402 may update a manifest (e.g., a set of entitlements and/or relationships) stored on HVAC device 402. In this regard, network communications controller 510 may receive the updated manifest via network interface 504 and network communications controller 510. The updated manifest may be encrypted. In this regard, decryption controller 522 can decrypt the updated manifest via a device key received from device key controller 514 and/or a device ID received from device ID controller 516.

At 808, the HVAC device can request a payload based on a manifest (e.g., the received manifest). The entitlements of the received manifest may be defined by the updated manifest received from the authentication server in step 806 or otherwise a manifest stored on HVAC device 402. The requested payload may be for a software update, a software license, a software feature, a login request, etc. In some embodiments, payload request controller 524 compares the current entitlements of a manifest stored in manifest controller 518 to the current features of HVAC device 402.

In some embodiments, the payload request includes an SAS token generated by SAS permissions module 526, SAS timed availability module 528, and/or payload request controller 524 of HVAC device 402. The SAS token may give the payload request certain read and/or write access. Further, the SAS token may temporarily activate the payload request. The payload request may available for a predetermined amount of time based on an SAS token included in the payload request. In step 810, HVAC device 402 receives the payload request from authentication server 404 and updates its storage modules accordingly. For example, HVAC device 402 may force a restart and cause certain software to be installed and/or updated. In some embodiments, HVAC device 402 may prompt a user to confirm installation and/or utilization of the payload. In various embodiments, the payload received from authentication server 404 includes an SAS token. The payload may be only active for a predefined amount of time. For this reason, payload storage 530 may install and/or save the payload before the predefined amount of time expires.

Figure 9:
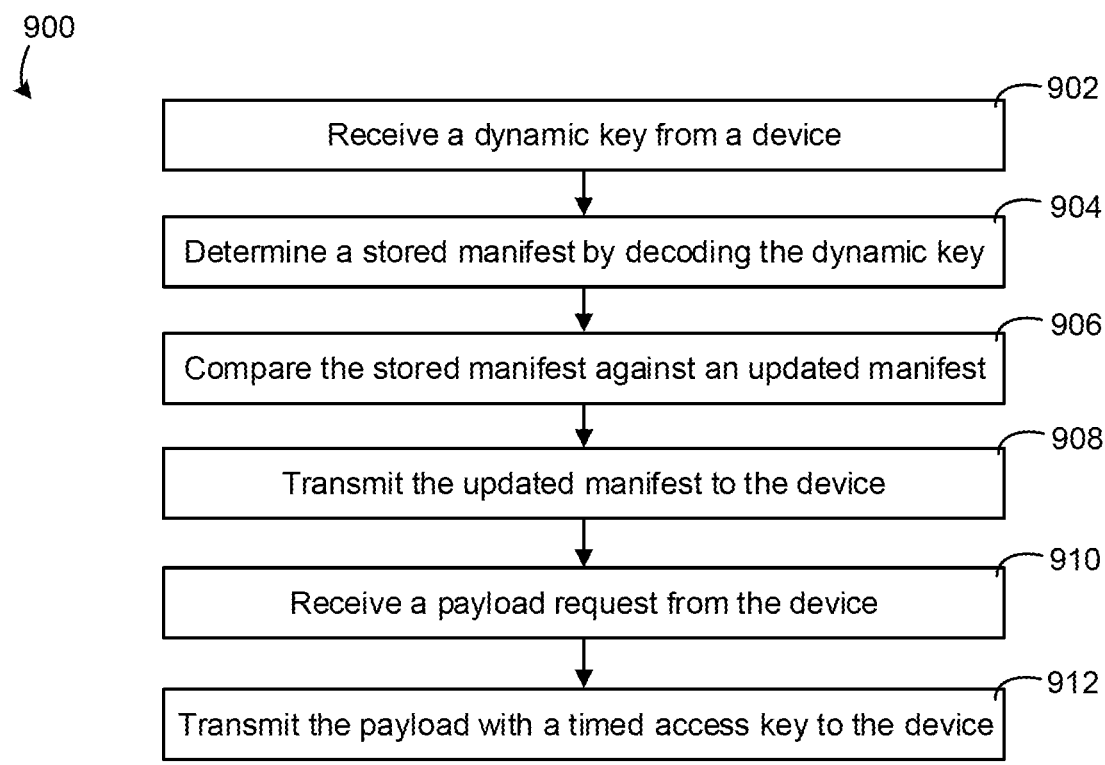
FIG. 9 is a flow diagram illustrating a process for authenticating an HVAC device and transmitting a payload that can be performed by the authentication server of FIG. 6, according to some embodiments.

Referring now to FIG. 9, a process 900 for updating a manifest on an HVAC device with an authentication server and transmitting a payload using the authentication server is shown, according to some embodiments. Authentication server 404, user device 406, and/or HVAC device 402, are described with reference to FIGS. 4 and 6, can be configured to perform process 900. In one embodiment, when the HVAC device (e.g., HVAC device 402) is online, authentication server 404 acts as the authentication server. In another embodiment, when the HVAC device is offline, user device 406 acts as the authentication server. This may allow for either a user of a technician device (e.g., user device 406) and/or a cloud server (e.g., authentication server 404) to perform process 800 based on the network status of HVAC device 402. In this regard, user device 406 may include some and/or all of the functionality of authentication server 404.

At 902, authentication server 404 receives a dynamic key from HVAC device 402. Authentication server 404 may receive the dynamic key via a wired and/or wireless connection. Authentication server 404 may receive the dynamic key via network interface 604 and/or network communications controller 610. In step 904, the dynamic key is decoded by authentication server 404 and a manifest is generated based on the decoded manifest by authentication server 404. In some embodiments, decryption controller 612 decodes the dynamic key based on a device key and a device ID received from device identifier controller 628. Device identifier controller 628 can use a device ID that may be part of the transmission of the dynamic key to determine which device (e.g., HVAC device 402) has sent the dynamic key and which device key and/or device ID should be used to decode the dynamic key. The decoded manifest represents the manifest asserted by HVAC device 402 and/or the manifest currently stored by HVAC device 402.

In step 906, the authentication server can compare the stored manifest with an updated manifest. Manifest lookup controller 616 may compare the manifest received from the device to the current manifest for the device. The updated manifest may be the manifest associated with HVAC device 402 that is stored on the authentication server. If authentication server 404 determines that the stored manifest decoded from the dynamic key does not match the updated manifest stored on authentication server 404, authentication server 404 can transmit the updated manifest to HVAC device 402. Transmitting the updated manifest to HVAC device 402 may cause the manifest stored by HVAC device 402 to be updated (step 908). In some embodiments, manifest lookup controller 616 uses the device ID to determine which manifest to compare the received manifest to. In response to the received manifest not matching the device manifest, manifest lookup controller 616 may send a current and/or updated manifest to encryption controller 618 to be encrypted and then sent to HVAC device 402. In some embodiments, encryption controller 618 encrypts the update manifest via the device key and the device ID.

Sending the updated manifest to HVAC device 402 may verify that authentication server 404 and HVAC device 402 have the same manifest and are thus synchronized. In some embodiments, verification of the manifest by authentication server 404 and/or by HVAC device 402 can ensure that integrity of the manifest is maintained. For example, if the manifest stored by HVAC device 402 is determined to be different than the manifest stored by authentication server 404, an action may be taken to alert the system or a user that the data may have been compromised.

In step 910, authentication server 404 can be configured to receive a payload request from HVAC device 402. In some embodiments, the payload request is only active for a predetermined amount of time. After that time has expired, authentication server 404 may no longer be able to reply to the payload request. In step 912, authentication server 404 is configured to transmit the payload to HVAC device 402. In some embodiments, authentication server 404 checks a manifest stored by authentication server 404 to determine if HVAC device 402 has an entitlement for the payload. If HVAC device 402 does have an entitlement for the requested payload, the authentication server 404 may send the payload to HVAC device 402. If HVAC device 402 does not have an entitlement for the requested payload, authentication server 404 may not send the requested payload to HVAC device 402.

Figure 10:
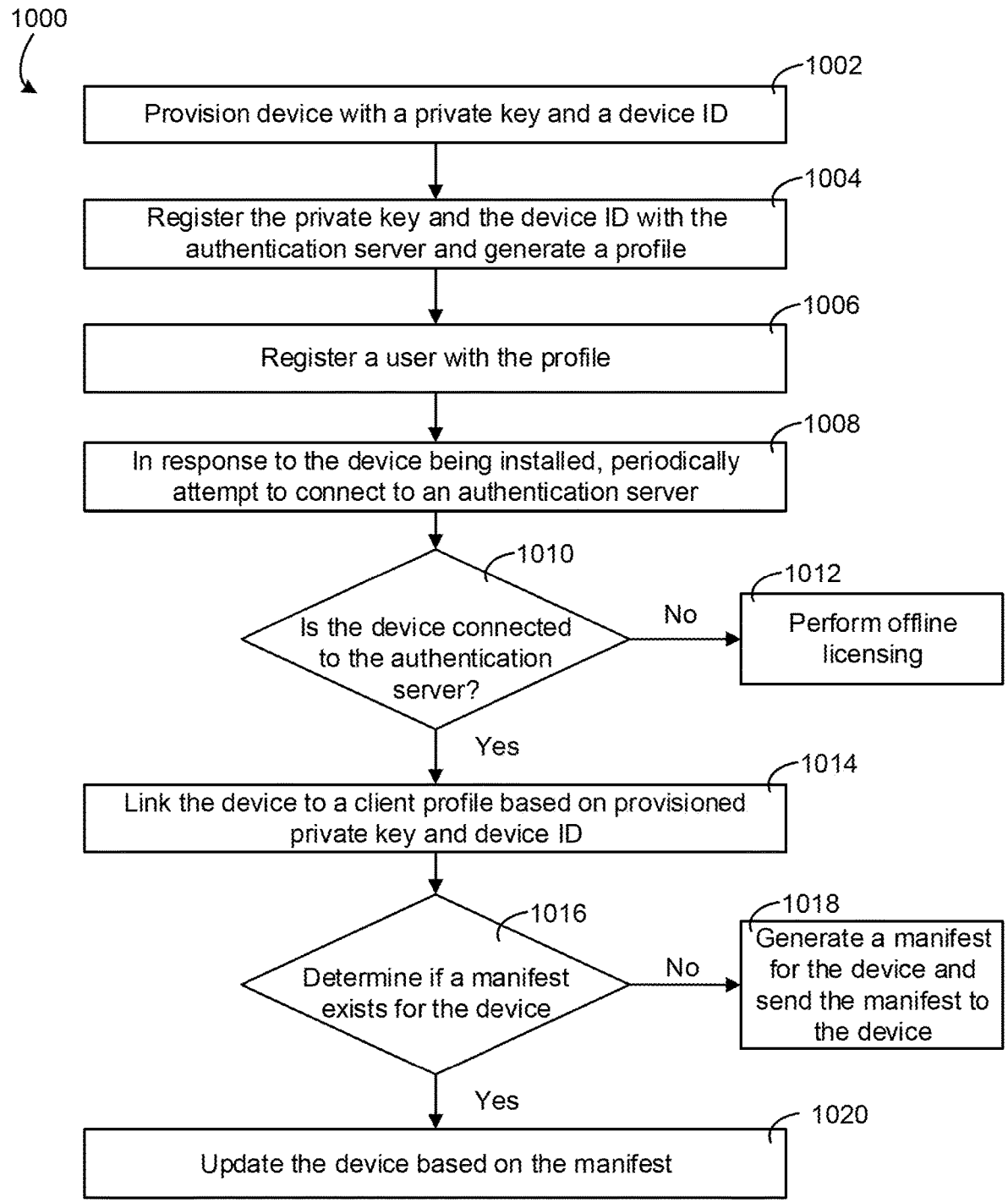
FIG. 10 is a flow diagram illustrating a process for performing online, offline, and hybrid licensing with the HVAC device and authentication server of FIG. 4A, according to some embodiments.

Referring now to FIG. 10, a process 1000 is shown for performing online, offline, and hybrid activation of a device, according to an exemplary embodiment. HVAC device(s) 402, authentication server 404, and/or any other device of system 400 or otherwise described herein can be configured to perform process 1000. In step 1002, HVAC device 402 is provisioned with a device key and a device ID. In some embodiments, HVAC device 402 is provisioned with a particular operating system (e.g., a "Gold" operating system). In some embodiments, the device ID and the device key may be unique to HVAC device 402. The device ID may be a unique number associated with the device such as a unique alphanumeric string, a serial number of HVAC device 402, and/or any other identifier. In various embodiments, HVAC device 402 is provisioned by a manufacturer and/or any other entity. In various embodiments, the device key and/or device ID are saved to HVAC device 402 based on whether HVAC device 402 includes a trusted platform module (TPM). If the HVAC device 402 includes a TPM, the HVAC device 402 may store the device key and/or device ID according to the protocols of the TPM. If the HVAC device 402 does not include a TPM, the HVAC device 402 may store the device key and/or device ID in a file and/or file field which may be stored in a secure storage location. Further, in some embodiments, the device ID may be stored with BIOS software of the HVAC device 402. For example, a serial number of BIOS software may become and/or may be updated with the device ID.

In step 1004, the device key and the device ID that are used to provision the HVAC device 402 are registered with an authentication server (e.g., authentication server 404, device registry 425, etc.). In some embodiments, a user registers the device key and/or the device ID via a web portal (e.g., access portal 424). In various embodiments, the device key and/or the device ID are uploaded to authentication server 404 (e.g., an IoT hub such as AZURE® IoT Hub). In some embodiments, authentication server 404 is configured to store the device key and the device ID in secure permanent storage and/or may be stored by a security API. In some embodiments, a manufacturer and/or any other individual may register the device key and the device ID with authentication server 404 (e.g., access portal 424) via user device 406. In various embodiments, the device key and the device ID are linked to a particular profile associated with the HVAC device 402 and/or a particular user profile (e.g., a particular user). In this regard, a device (e.g., HVAC device 402) can be associated with a particular user. In various embodiments, the device key and the device ID make up the profile for HVAC device 402. The profile may be registered as a device that has been manufactured and/or provisioned but has not yet been purchased by an end user.

In step 1006, a user may be registered with the profile created in step 1004. In some embodiments, the user registered with the profile is a customer of HVAC device 402. In various embodiments, when HVAC device 402 is purchased by a user, a sales individual and/or any other individual responsible for the sale, may register the user with a user profile and/or create a new user profile. In various embodiments, the purchased device (e.g., HVAC device 402) may be associated with a user and/or user profile. In some embodiments, the user is registered with the profile via user device 406 and authentication server 404. In some embodiments, the name of the user, contact information (e.g., phone number, email address), address, associated business, and/or any other information regarding the user may be registered (e.g., added) to the profile. In some embodiments, if the user already has an existing customer account, the customer account may be linked to the HVAC device 402. In some embodiments, upon registering the user with HVAC device 402, a particular set of entitlements may be associated with HVAC device 402. Further, authentication server 404 may record which HVAC devices 402 have been registered, imaged, provisioned, etc. and may use a tag and/or descriptor to identify which HVAC devices 402 have been registered, imaged, provisioned, etc.

In various embodiments, authentication server 404 adds and/or updates a device in an IoT hub device registry. In various embodiments, authentication server may determine if the device is already registered, can set various authentication values (e.g., device ID, device key), and can update the IoT hub device registry. In a similar manner, authentication server 404 can update a document database with the various device registration information.

In some embodiments, a user may indicate upon registration and/or at any other time, whether HVAC device 402 will have access to the internet (e.g., a connection to authentication server 404). In this regard, if the user and/or any other individual indicates that HVAC device 402 will not be connected to the internet (e.g., indicate via access portal 424 and user device 406), authentication server 404 can be configured to send a file (e.g., a text file) which may include licensing ability (e.g., entitlements, a manifest, etc.). The file may be encrypted with the device ID and the device key. In some embodiments, the file is encrypted based on seed-key process and/or encryption processes described in FIGS. 8-9. In this regard, HVAC device 402 can be configured to decrypt the file and update entitlements and/or manifest information. In various embodiments, authentication server 404 can be configured to send the file to a user (e.g., send to user device 406). In some embodiments, access portal 424 can allow a user (e.g., a sales person) to send the file to a user device if the user believes that HVAC device 402 will never be online. In various embodiments, the file is sent to an email address, a phone number, and/or any other contact means associated with the user. In some embodiments, the file is stored in permanent storage secure storage and/or is stored and/or maintained by a security API (e.g., on HVAC device 402 and/or authentication server 404).

At 1008, HVAC device 402 periodically (e.g., once an hour, once a day, once a week, etc.) attempts to connect to a network (e.g., network 408) and/or authentication server 404. In some embodiments, HVAC device 402 may periodically attempt to update software, update permissions, update licensing, update a manifest, etc. In some embodiments, step 1008 occurs in response to HVAC device 402 being installed in a building and/or being powered on for a first time. HVAC device 402 may function immediately after being installed and/or may perform a registration process. If various software run by the device if not yet licensed (e.g., a controller and/or gateway running METASYS®), the user may receive a message indicating the software is not yet licensed. In this regard, the software may continue to function for a predefined amount of time (e.g., 30 days) and/or until HVAC device 402 receives the appropriate permissions and/or licenses for the software.

At 1010, if HVAC device 402 determines that it is not connected to the network (e.g., connected to authentication server 404), HVAC device 402 is shown to perform offline licensing (step 1012). At 1012, HVAC device 402 can be configured to perform offline licensing of HVAC device 402. In some embodiments, a user may need to update the licensing (e.g., a manifest) of HVAC device 402 via user device 406 and the file received from authentication server 404 in step 1006. The HVAC device 402 can receive licensing (e.g., a manifest) from a client update utility which may run on the HVAC device 402, user device 406, gateway 422, and/or any other device. The client update utility can be configured to retrieve a device key and/or a device ID on HVAC device 402 (e.g., from storage, from storage on a trusted platform module (TPM), from authentication server 404, etc.). The client update utility can be configured to validate whether HVAC device 402 is online and/or offline.

In some embodiments, the client update utility is the licensing tool interface shown in FIG. 11. In this regard, the client update utility allows a user to load a file onto HVAC device 402. In some embodiments, the file is encrypted by a device ID and/or device key of HVAC device 402 (e.g., an encrypted manifest). The file that the client update utility provides to HVAC device 402 can be decrypted by HVAC device 402 (via the device ID and/or device key) and utilized by HVAC device 402.

Further, the client update utility may allow a user to load the file generated in step 1006 to the client update utility (e.g., via a wired and/or wireless adhoc connection, an internal network, etc.). In some embodiments, the client update utility and/or HVAC device 402 provides a page and/or interface that allows a user to upload the file. In various embodiments, the client update utility can connect directly to authentication server 404 to retrieve the file, a manifest, and/or any other device information and/or device related data. Further, the client update utility can be configured to identify a current version of software installed on HVAC device 402, notify authentication server 404 of the current version of software installed on HVAC device 402, download various updates for HVAC device 402, install various updates on HVAC device 402, and/or extract licensing information from the file. The client update utility may be available when HVAC device 402 is offline and/or when HVAC device 402 is online. In various embodiments, the client update utility allows for software to be loaded onto HVAC device 402 and installed.

In some embodiments, user device 406 can send the file to HVAC device 402. In this regard, HVAC device 402 can decrypt the file and assume (e.g., install and/or update) the permissions and/or manifest included in the encrypted file. In step 1010, if HVAC device 402 determines that it is connected to authentication server 404, HVAC device 402 can perform step 1014. In various embodiments, the encrypted file can be uploaded to HVAC device 402 via a USB connection, a secure digital (SD) card, over a network, and/or any other connection method.

At 1014, HVAC device 402 can be configured to associate HVAC device 402 with the profile created in step 1004. In some embodiments, HVAC device 402 sends the device key and the device ID provisioned in step 1002 to authentication server 404. In response, authentication server 404 may send software updates and/or a manifest to the HVAC device 402 for installation. In this regard, authentication server 404 may link HVAC device 402 to the user profile. In step 1016, authentication server 404 determines if a manifest exists for HVAC device 402 based on the user profile and/or device key and/or device ID. In this regard, if authentication server 404 determines that a manifest does not exist, authentication server 404 can be configured to generate a manifest for HVAC device 402 (step 1018). In some embodiments, the manifest may be generated based on the user profile. In various embodiments, the manifest is generated based on the device key and the device ID.

In step 1016, if authentication server 404 determines that a manifest exists for HVAC device 402, authentication server 404 can be configured to send the manifest to HVAC device 402 at 1020. In some embodiments, authentication server 404 determines if a manifest exists for HVAC device 402 based on the device ID and the device key. In this regard, HVAC device 402 can be configured to assume (e.g., install, update, etc.) the new manifest. In various embodiments, upon completion of the installation, the HVAC device 402 may indicate that the software has been installed via a user interface (e.g., a console). For example, if META-SYS® is being installed on a controller (e.g., HVAC device 402), upon completion of the installation, a console connected to the controller may display a message informing the user that they are licensed to use METASYS® and the controller may automatically navigate to the installed and licensed software.

Referring now to FIG. 11 a licensing tool interface is shown, according to some embodiments. The licensing tool may run remotely and/or locally in a building (e.g., building 10). In some embodiments, the licensing tool may be run on a controller or gateway, such as one of HVAC devices 402. In various embodiments, the licensing tool may run via authentication server 404 (e.g., access portal 424). The licensing tool may be accessible via user device 406 and/or may be installed on user device 406. In some embodiments, the tool runs on a technician's laptop computer and may be hosted on a website that a technician can download the tool from and install the tool on the laptop computer. In various embodiments, the technician may register the licensing tool by entering details such as the technician's name, a company email, contact details, etc. This information may be acquired via a questionnaire. In various embodiments, the technician is only allowed to download, install, or use the licensing tool after validation of the company email address.

The licensing tool may allow a user to register a new HVAC device 402 with authentication server 404. Registration page 1100 shows an example of a registration page for a device. Device name 1102, device key 1104, and registration status 1106 may be information boxes which a user may enter information regarding a new HVAC device 402. After pressing register 1108, the new device may be registered with authentication server 404.

Licensing inventory page 1111 displays software that may be currently installed and/or licensed for one of HVAC devices 402 and the current status of the license. Licensing inventory page 1111 displays the name of the products and features 1112, a licensing type 1114, a status 1116, an expiration date 1118, and an update option 1120. The update option may allow a user to activate software, deactivate software, and/or extend the license of software via an activate new window 1122. In some embodiments, a user may activate software via an activation ID 1124. Pressing activate button 1128 may activate the entered activation ID 1124 while cancel button 1126 may cancel the activation of activation ID 1124. In some embodiments, activation ID 1124 is an alphanumeric string and/or SKU code of a product. Activating the software via activation ID 1124 may unlock and/or lock various software features for HVAC device(s) 402. In some embodiments, products and features 1112 may be specific features of various devices and/or a particular building. A user may activate and/or deactivate these specific features. For example, the specific features may be activating for deactivating Wi-Fi, 3G connections, 4G connections, etc. for a particular HVAC device 402. Licensing inventory page 1111 is shown to include an indicator, connection status 1113. Connection status 1113 may indicate whether a gateway and/or controller running the licensing tool is connected to authentication server 404.

In various embodiments, inventory page 1111 may show products and features 1112 and/or installed equipment for various customers, geographic regions, or company branches. In some embodiments, inventory page 1111 allows for multiple "super portfolios" to be built and viewed. For example, a super portfolio may allow for a company to keep track of products and features 1112 for various countries, districts within countries, and buildings within the various districts. This information may be organized in a tree view so a user can quickly identify information they may be interested in. The licensing tool may take into account currencies and/or tariffs for the various countries within the super portfolio.

Activating and/or extending one of products and features 1112 may require payment. In this regard, the licensing tool may prompt a user to enter payment information and/or may connect with payment software. In various embodiments, deactivating one of products and features 1112 may cause a user to receive a refund automatically.

In some embodiments, activation ID 1124 is generated by a product and/or software ordering system. In various embodiments, the licensing tool can be configured to intelligently validate the license key and indicate if there are errors in the entered activation ID 1124.

Products and features 1112 may be various software entitlements. For example, the entitlement may be a piece of software that may have a time based license. In some embodiments, the entitlement is a number of building meters, a maximum number of points for one of HVAC devices 402, various software drivers, software themes, and/or any other product or software feature. In some embodiments, the products and features 1112 may be the number of gateways 422 allowed in a building.

Downloads 1130 may be software downloads that are installed on one of HVAC devices 402. In some embodiments, installed version 1132 indicates the software version that is currently installed on one of HVAC devices 402, the available version 1134 may be the current version available for download, status 1136 may indicate whether the software has been downloaded, installed, is pending installation and/or download, etc. Progress 1138 may be a meter which indicates the download progress of downloads 1130. The update button 1140 may cause new software versions to be downloaded. Refresh button 1142 may refresh status 1136. Download all button 1144 may cause all new software pending software updates to be downloaded. In some embodiments, the licensing tool automatically and/or on demand checks for updates, download available updates, and/or install the downloaded updates. Further, the tool can automatically detect which software versions are downloaded and/or installed and can automatically install software updates in response to determining that a piece of software is not up to date, is waiting to be installed, and/or based on a software update schedule. In some embodiments, the licensing tool downloads the software and/or checks for software updates once a day. In some embodiments, license files are downloaded in an encrypted manner.

In some embodiments, the tool of FIG. 11 may send out an warning message regarding near expiring licenses. In some embodiments, the tool may allow a user to make payments for products and features 1112 and/or may be integrated with billing and payment software. In some embodiments, the licensing tool may allow a user to hit a discovery button to discover various HVAC devices 402 in a building and display the gateways in a list with IP addresses and software version numbers. Via the licensing tool, a technician may be able to provision the discovered HVAC devices 402 and/or view additional information regarding the discovered HVAC device 402.

In various embodiments, the licensing tool may notify a user of pending expiration of a products and features 1112. In some embodiments, the licensing tool may display a pop-up message notifying the user of the pending expiration. In various embodiments, the licensing tool may send an email message to a user reminding the user of the pending expiration of products and features 1112.

In some embodiments, the licensing tool allows a technician to register multiple data collectors (e.g., gateway 422) for a single building. In some embodiments, a technician may select where the data collected by the data collectors is sent (e.g., to an endpoint, another device, a URL). This may be done when data collectors are all "hosted" as described further with reference to FIG. 4B In various embodiments, the data collectors are all stored under a single identifier (e.g., key value). This may be done when data collectors are all "on-premises" as described further with reference to FIG. 4B. The identifier may be the same for every single data collector of the building. In this regard, a user may manage multiple data collectors together via the licensing tool. For example, a user may set, via the licensing tool, that all data collectors of a building send their data to a particular server (e.g., authentication server 404).

Figure 12:
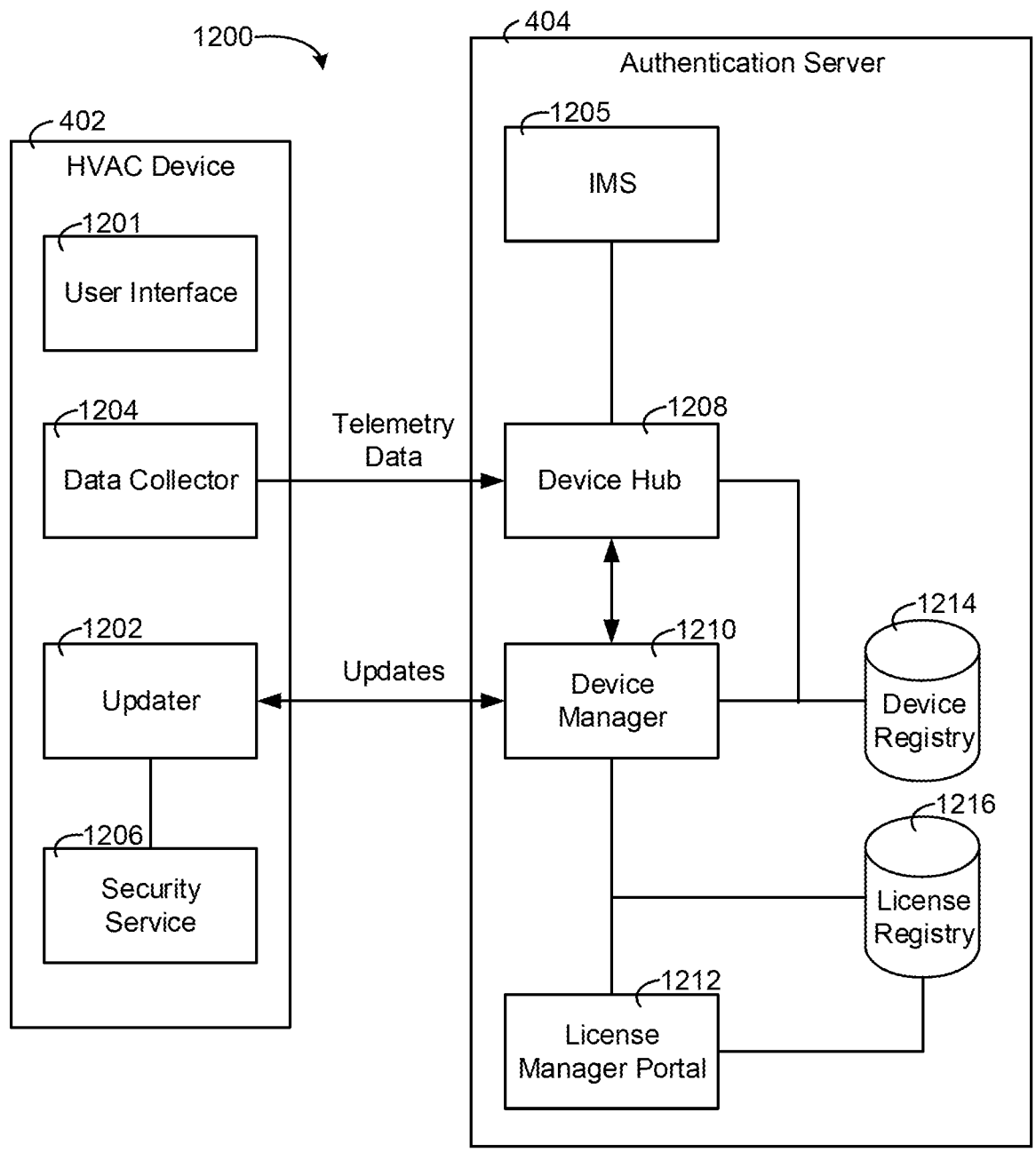
FIG. 12 is a block diagram of one of the HVAC devices of FIG. 4A communicating to network services, according to an exemplary embodiment.

Referring now to FIG. 12, a system 1200 including HVAC device 402 and various network services for HVAC device 402 is shown, according to an exemplary embodiment. The various network services shown in FIG. 12 may be services stored and operated on one or more network servers. In some embodiments, the network services, i.e., identity management system (IMS) 1205, device hub 1208, device manager 1210, and/or license manager portal 1212 may be included in a server such as authentication server 404 as described with reference to FIG. 4A and elsewhere herein.

HVAC device 402 of FIG. 12 may include user interface 1201, data collector 1204, updater 1202, and security service 1206. HVAC device 402 can include processing circuit 502 as described with reference to FIG. 5 and this processing circuit can be configured to perform the functionality of HVAC device 402 as described in FIG. 12, FIGS. 13-19, and elsewhere herein. Similarly, processing circuit 602 of authentication server 404 can be configured to perform the functions of authentication server 404 as described in FIG. 12, FIGS. 13-19, and elsewhere herein. User interface 1201 may be an interface for a user that allows a user to configure and/or control HVAC device 402. In some embodiments, user interface 1201 is the user interface shown in FIG. 11. User interface 1201 may allow a user to upload a manifest to HVAC device 402 and/or otherwise interact with HVAC device 402. Data collector 1204 can be configured to communicate with device hub 1208 via a network or the Internet (e.g., network 408). Data collector 1204 may send telemetry data that HVAC device 402 collects and/or any other data to device hub 1208 (e.g., fault data, point data, etc.).

Updater 1202 can be configured to perform manifest updating and/or software updating. Updater 1202 include some and/or all of the functionality of the various components of memory 508 as described with reference to FIG. 5. Security service 1206 can be configured to store a manifest for HVAC device 402 and/or store software files. In this regard, updater 1202 can store and/or retrieve data (e.g., a manifest) from security service 1206. Updater 1202 is shown to communicate with device manager 1210. Updater 1202 can be configured to communicate with device manager 1210 to update a manifest and/or software. HVAC device 402 and authentication server 404 can be configured to communicate via network 408. Specifically, updater 1202 and device manager 1210 can communicate via network 408 and likewise data collector and device hub 1208 can be configured to communicate via network 408.

IMS 1205 can be configured to perform various identification and authorization services for authentication server 404. Device manager 1210 can be configured to perform various manifest updating and/or software licensing for HVAC device 402. Device manager 1210 is shown to communicate with license manager portal 1212. License manager portal 1212 may be an online portal (e.g., access portal 424) that a user can login to and update the licensing (e.g., manifest) for HVAC device 402 and/or perform any other control or configuration of HVAC device 402. Device manger 1210 and license manager portal 1212 are shown to communicate to license registry 1216. License registry 1216 may be the same and/or similar to license registry 427 and can be configured to store licensing information for HVAC device 402 that device manager 1210 and/or license manager portal 1212 can store information to and/or retrieve information from. Device hub 1208 and device manager 1210 are shown to communicate to device registry 1214. Device registry 1214 may store information regarding HVAC device 402 (e.g., fault history, specifications, collected data, etc.) that device hub 1208 and/or device manager 1210 can be configured to read and/or write.

Referring generally to FIGS. 13-19, processes 1300-1900 are shown that HVAC device 402 and authentication server 404 can be configured to perform. Specifically, the processing circuits (e.g., processing circuit 502 and processing circuit 602) of HVAC device 402 and/or authentication server 404 can be configured to perform the processes of FIGS. 13-19. The steps of FIGS. 13-19 that indicate communication between HVAC device 402 and authentication server 404 can be communication via one or more networks or the Internet, e.g., network 408.

Figure 13:
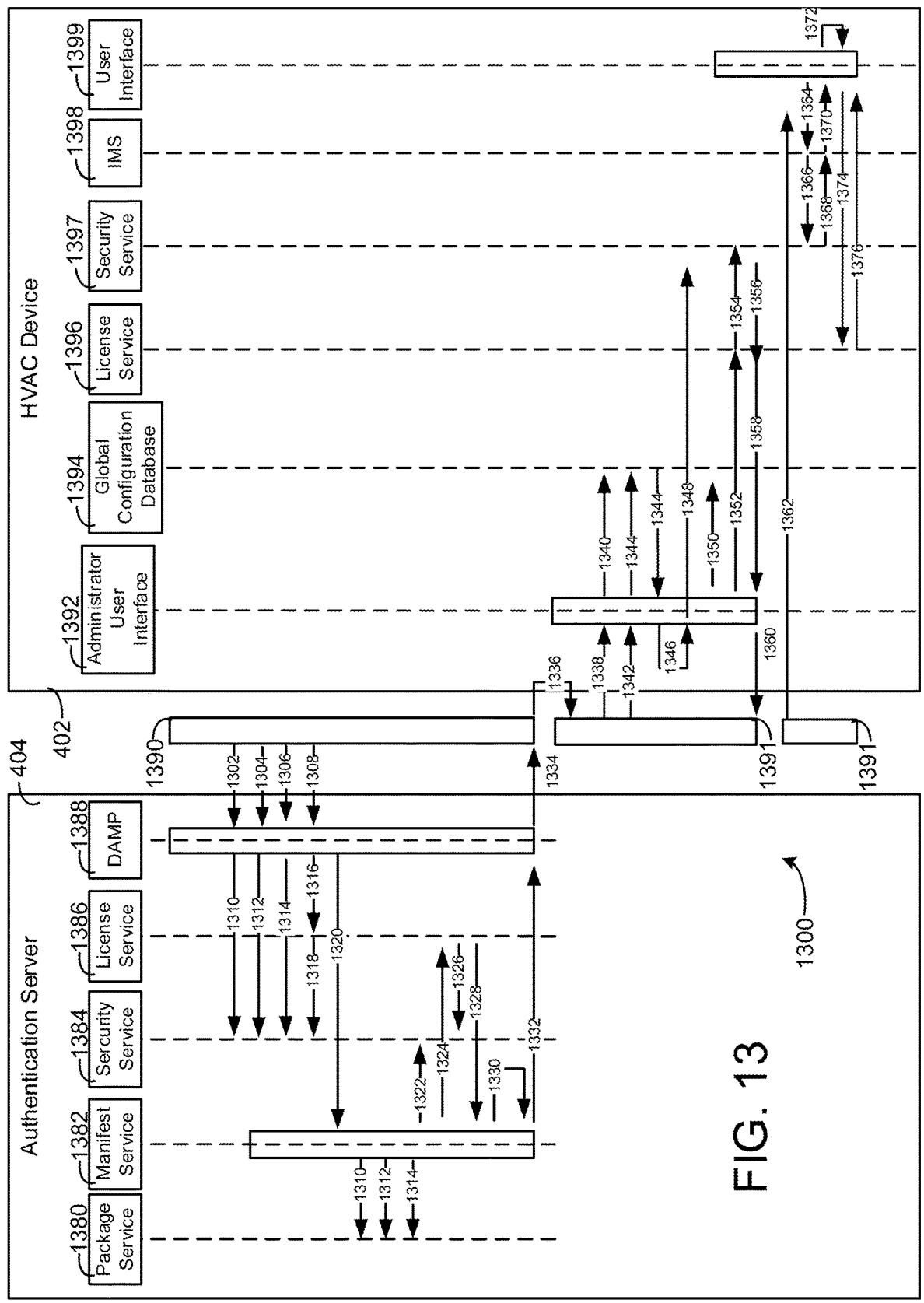
FIG. 13 is a flow diagram of a process for managing licensing of one of the HVAC devices of FIG. 4A via a manifest, according to an exemplary embodiment.

Referring now to FIG. 13, a process 1300 is shown for managing licensing for HVAC device 402 via a manifest, according to an exemplary embodiment. The various components shown in FIG. 13 may be components of a server and/or servers (e.g., authentication server 402) and/or on a local device (e.g., HVAC device 402) and/or shown in FIG. 12. In the middle of FIG. 13 is a user 1390. User 1390 may be an administrator level user. User 1390 may access (e.g., via a mobile device, e.g., user device 406) various user interfaces of both authentication server 404 and/or HVAC device 402.

Device Administration and Management Portal (DAMP) 1388, license service 1386, security service 1384, manifest service 1382, and package service 1380 may be components of authentication server 404, the functionality of which can be performed on one or more processors and/or memory devices (e.g., processing circuit 602).

Administrator user interface 1392, global configuration database 1394, license service 1396, security service 1397, identity management system (IMS) 1398, and user interface 1399 can be components of HVAC device 402, the functionalities of which can be performed on one or more processors or memory devices (e.g., processing circuit 502).

In steps 1302, 1304, and 1306 user 1390 may indicate to DAMP 1388 a new group, new device, and/or new user (e.g., a new administrator for a group) respectively. The group, device, or user may be entities included in a manifest or may be used to create a new manifest for a device (e.g., HVAC device 402). In step 1308, user 1390 may indicate to DAMP 1388 to generate a new license (e.g., a license for software). In steps 1302, 1304, and 1306, DAMP 1388 may store the new device, new group, and new user into a single organization data structure. The organization data structure may be any data structure (e.g., struct, object, etc.) that stores the licensing and/or relationships between various devices, groups, and users.

DAMP can be configured to send the new group, new device, and new user to security service 1384 in steps 1310, 1312, and 1314. In step 1316, DAMP 1388 can save the new license to license service 1386. License service 1386 may send the new license to security service 1384 to be stored in the organization data structure. Next, in step 1320, DAMP can send a request for a manifest for a particular device (e.g., the new device of step 1304 or HVAC device 402) from manifest service 1382. In response to the manifest request, in step 1322, manifest service 1382 can retrieve information for the particular device (e.g., a device ID and a device key for the particular device) from security service 1384. In steps 1324-1328, manifest service 1382 can retrieve licensing information from license service 1386. Manifest service 1382 may send a license request for the organization data structure to license service 1386 in step 1324. In response to receiving this request, license service 1386 may retrieve the licensing stored in the organization data structure in security service 1384 and send the licenses to manifest service 1382. In steps 1310-1328, manifest service 1382 may retrieve information for software downloads to package service 1380. In steps 1310-1328, manifest service 1382 may retrieve configuration settings for HVAC device 402, may retrieve software downloads available for HVAC device 402, and/or may retrieve software versions.

In step 1330, manifest service 1382 can generate a manifest and encrypt the manifest with the device ID and/or device key retrieved in step 1322. The generated manifest may indicate the licensing of HVAC device 402 and/or software download locations for software that HVAC device 402 is licensed for. The manifest generated may be the manifest discussed elsewhere herein (e.g., discussed in FIGS. 4A-9). The encrypted manifest can be provided to DAMP 1338 in step 1332. User 1390 can download the encrypted manifest in step 1334 from DAMP 1388. In some embodiments, the device ID and/or device key are further included in the download of step 1334 and are thus provided along with an encrypted manifest in step 1332 to DAMP 1388. In step 1336, user 1390 can provide the encrypted manifest, the device ID, and/or the device key to an end user 1390. In some embodiments, the information is provided via an email, by placing the information on a storage device (e.g., CD, USB, drive etc.), sent via a text message, and/or any other method of communication.

User 1390 may provide a file that includes the manifest, device ID, and device key to an end user, end user 1391. In step 1338, end user 1391 can provide a device ID and a device key to administrator user interface 1392 and in step 1342 can provide administrator user interface 1392 with the encrypted manifest. In steps 1338 and 1342, end user 1391 may indicate that end user 1391 wants the device ID and/or device key to be saved to HVAC device 402.

In steps 1340, administrator user interface 1392 can save the device ID and device key to global configuration database 1394. The device ID and device key can be encrypted by administrator user interface 1392 before being stored in order to securely store the information and avoid any tampering or information leakage. In step 1344, administrator user interface 1392 can send a request to global configuration database 1394 to retrieve the stored device ID and the device key from global configuration database 1394. In response to the request, in step 1344, global configuration database 1394 can send the device ID and the device key to administrator user interface 1392. Administrator user interface 1392 can decrypt the encrypted manifest with the device ID and/or the device key in step 1346. In step 1348, administrator user interface 1392 can populate the contents of the manifest (e.g., device, groups, users, and/or licenses) by sending the manifest information to security service 1397. Security service 1397 may store the contents of the manifest in an organization data structure. In step 1350, administrator user interface 1392 can set various global settings in global configuration database 1394 for HVAC device 402 based on the decrypted manifest of step 1346. Administrator user interface 1392 can provide the licensing information included in the manifest to license service 1396 in step 1352 which can in turn provide the licensing information to security service 1397 in step 1354 which can be stored in the organization data structure.

Security service 1397 can return a license body to license service 1396 which may be the license information stored in the organization data structure stored in security service 1397 in step 1356. License service 1396 can provide the license information to administrator user interface 1392 in step 1358. In step 1360, administrator user interface 1392 can display the license information to end user 1391.

End user 1391 can login to user interface 1399 via a username, password, or other login credentials or login method in step 1362. In step 1364, user interface 1399 may cause and/or restrict the login of step 1362 through IMS 1398 which may perform authorization with security service 1397 in step 1366. In response to performing the authorization of step 1366, security service 1397 can provide an access token in steps 1368 and 1370 to user interface 1399. Based on the token, user interface 1399 can retrieve the licensing for HVAC device 402. In steps 1374 and 1376, user interface 1399 can retrieve licensing information from license service 1396 and display the license information to end user 1391.

Figure 14:
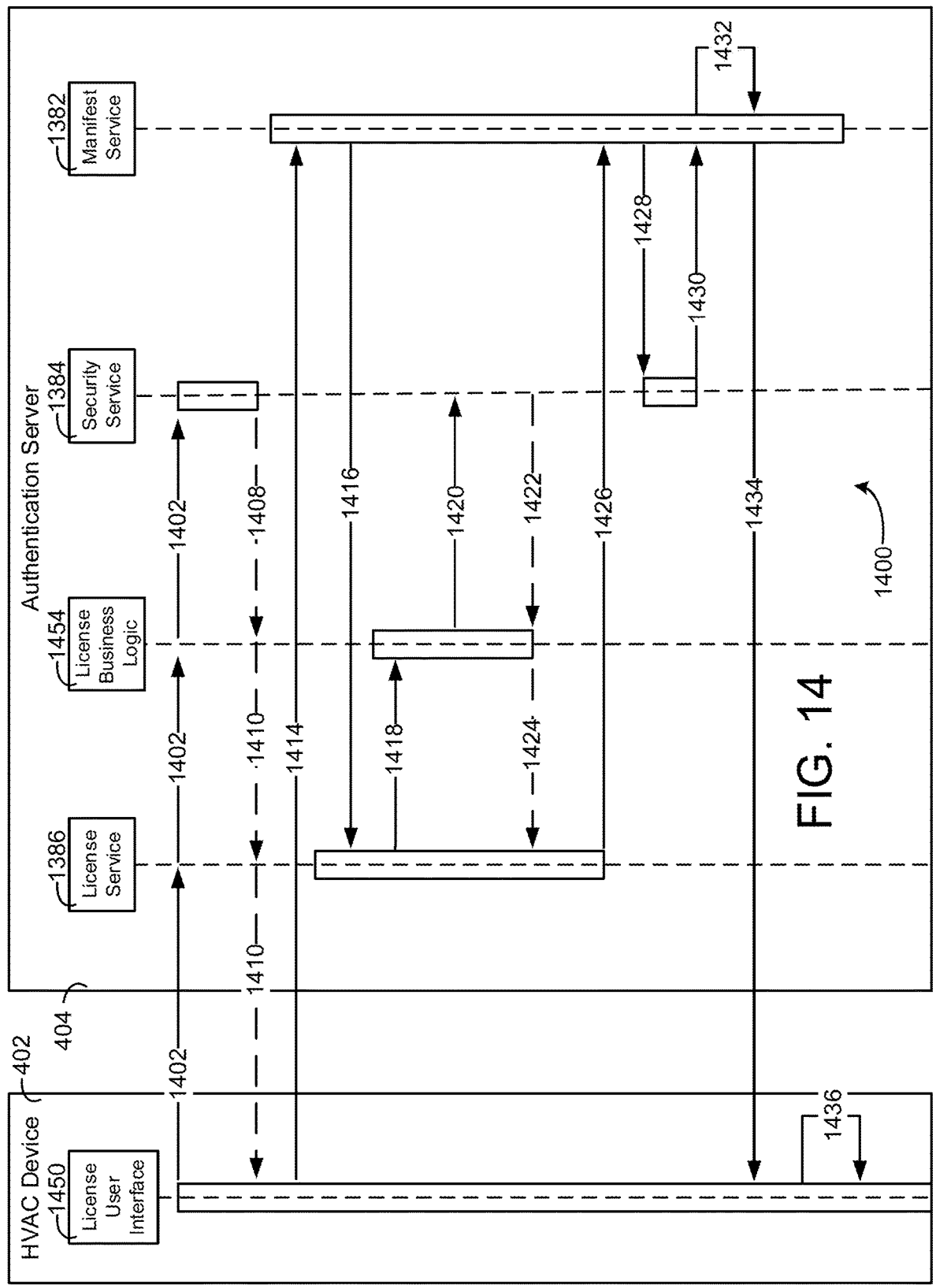
FIG. 14 is a flow diagram of a process for adding a new licensing for one of the HVAC devices of FIG. 4A, according to an exemplary embodiment.

Referring now to FIG. 14, a process 1400 for adding a new license is shown, according to an exemplary embodiment. In FIG. 14, HVAC device 402 is shown to include license user interface 1450. License user interface 1450 can be a component of HVAC device 402 that allows a user to interact with HVAC device 402 and/or add a new license. In some embodiments, license user interface 1450 may be implemented on a personal computer, laptop, smartphone (e.g., user device 406) so that a user can add a license via a personal device.

In step 1402, a user, via license user interface 1450, may send a request to security service 1384 for a new license and identify an organization data structure for that the user wants to add the license to. In some embodiments, step 1402 involves purchasing and paying for the license or adding a purchased license key to the request. In step 1408 and 1410, based on the organization data structure specified by the new license request of step 1402, security service 1384 may provide an organization data structure that identifies licenses for the organization to license business logic 1454. License business logic 1454 can use the data structure to determine licenses included in the organization data structure, including the newly added license, and provide the licenses and the data structure to license user interface 1450. In various embodiments, the newly added license can be a license associated with a particular user, device or group. License business logic 1454 and license service 1386 may be the same service i.e., license business logic 1454 may provide particular functionality for license service 1386.

In step 1414, license user interface 1450 may send a request for the manifest of HVAC device 402 to manifest service 1382. In step 1416, manifest service 1382 can send a request for licenses for HVAC device 402 (e.g., licenses identified in the organization data structure) to license service 1386. In step 1418, based on the organization data structure identified in step 1416, license service 1386 can send a request to license business logic 1454 for licenses in step 1418. In some embodiments, the request includes the identifier of the organization data structure. In step 1420, license business logic 1454 can send a request for licenses from security service 1384 for the organization data structure. Security service 1384 may reply with the organization data structure in step 1422 based on the organization identifier provided to security service 1384. The organization data structure may identify various licenses for the organization. Based on the various licenses of the organization data structure, license business logic 1454 can provide the licenses and the organization structure to license service 1386 in step 1424.

In step 1426, license service 1386 can provide the licenses of the organization data structure to manifest service 1382. Manifest service 1382 may send a request for the device ID and the device key of HVAC device 402 to security service 1384 in step 1428 which security service 1384 may reply to in step 1430. Based on the licenses identified in step 1434, manifest service 1382 generate a manifest for HVAC device 402 and encrypt the manifest with the device ID and the device key received in step 1430. In step 1434, manifest service 1382 can send the encrypted manifest to license user interface 1450 which license user interface 1450 can download in step 1436.

Figure 15:
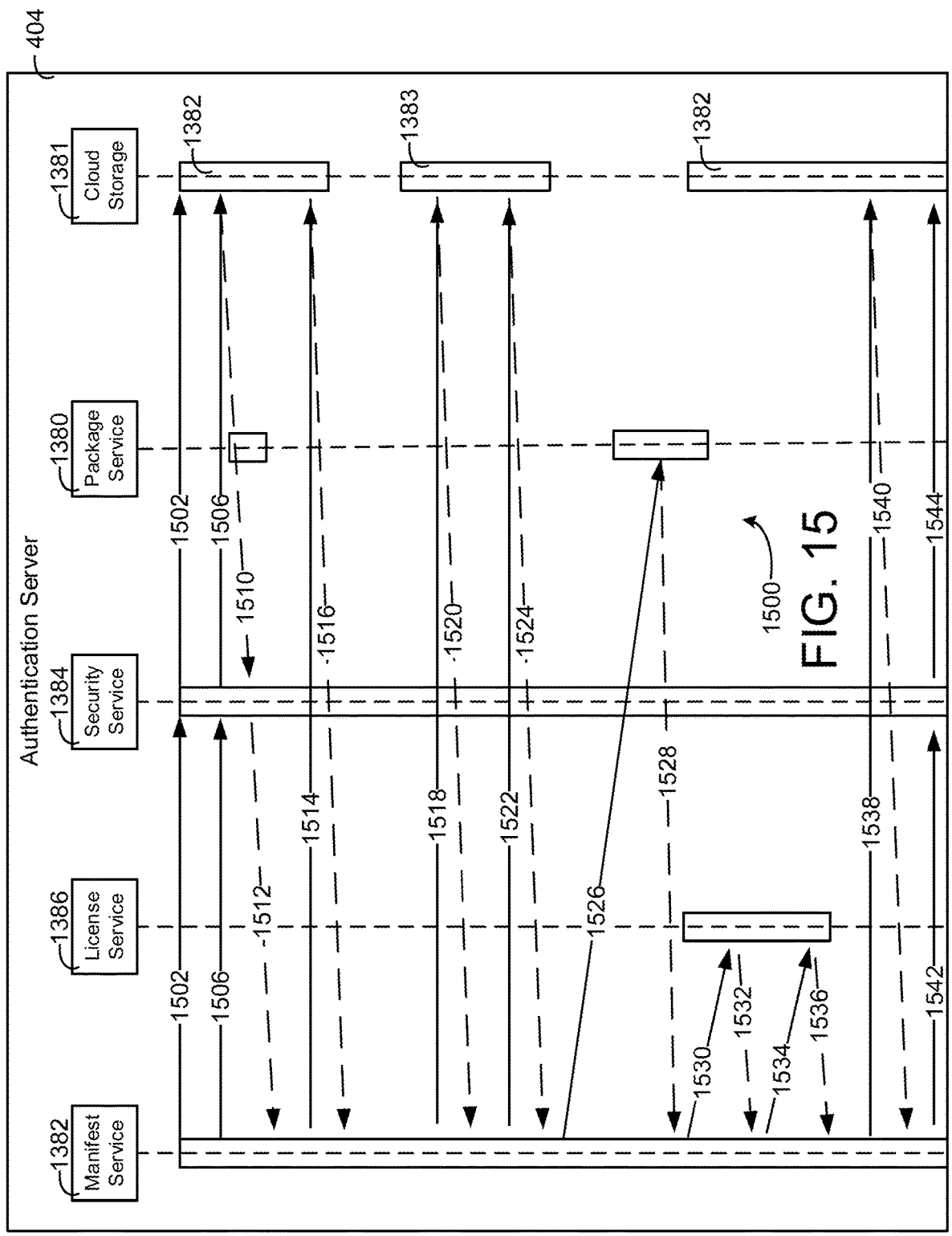
FIG. 15 is a flow diagram of a process for generating a manifest for one of the HVAC devices of FIG. 4A, according to an exemplary embodiment.

Referring now to FIG. 15. a process 1500 for device manager 1210 to retrieve information for generating a manifest by manifest service 1382, according to an exemplary embodiment. In step 1502, manifest service 1382 can set device information for HVAC device 402 to cloud storage 1381, specifically database 1382. Database 1382 may be a document database. In step 1506, manifest service 1382 can retrieve any device information stored in database 1382, including the information stored in database 1382 in step 1502. The information may be returned by cloud storage 1381 to manifest service 1512 in steps 1510 and 1512. The device information stored in document database

1382 may indicate the various relationships that the device may have with various groups, other devices, and users.

In step 1514, manifest service 1382 can cause database 1382 to store global configuration information in database 1382 for the device. The configuration information can be encrypted by manifest service 1382 before being stored in order to securely store the information and avoid any tampering or information leakage. A confirmation of storing the global configuration information may be returned by database 1382 in step 1516. In steps 1518-1524 manifest service 1382 can retrieve software download information from database 1383. Database 1383 may be a database such as Azure Tables. The information may include build versions, software names, and/or any other information. In steps 1526-1528, manifest service 1382 can retrieve software identifiers of software that is available for download from package service 1380. In steps 1530-1536, manifest service may retrieve license information from license service 1386 for licenses of HVAC device 402 and/or any organization, e.g., an organization that HVAC device 402 is part of. In steps 1538-1544, manifest service can retrieve global configuration from database 1382 for HVAC device 402 and set any device information in database 1382. Manifest service 1382 can generate a manifest based on the license information retrieved in steps 1530-1536, global configuration information retrieved in steps 1538-1540, and/or software information retrieved in steps 1518-1524.

Figure 16:
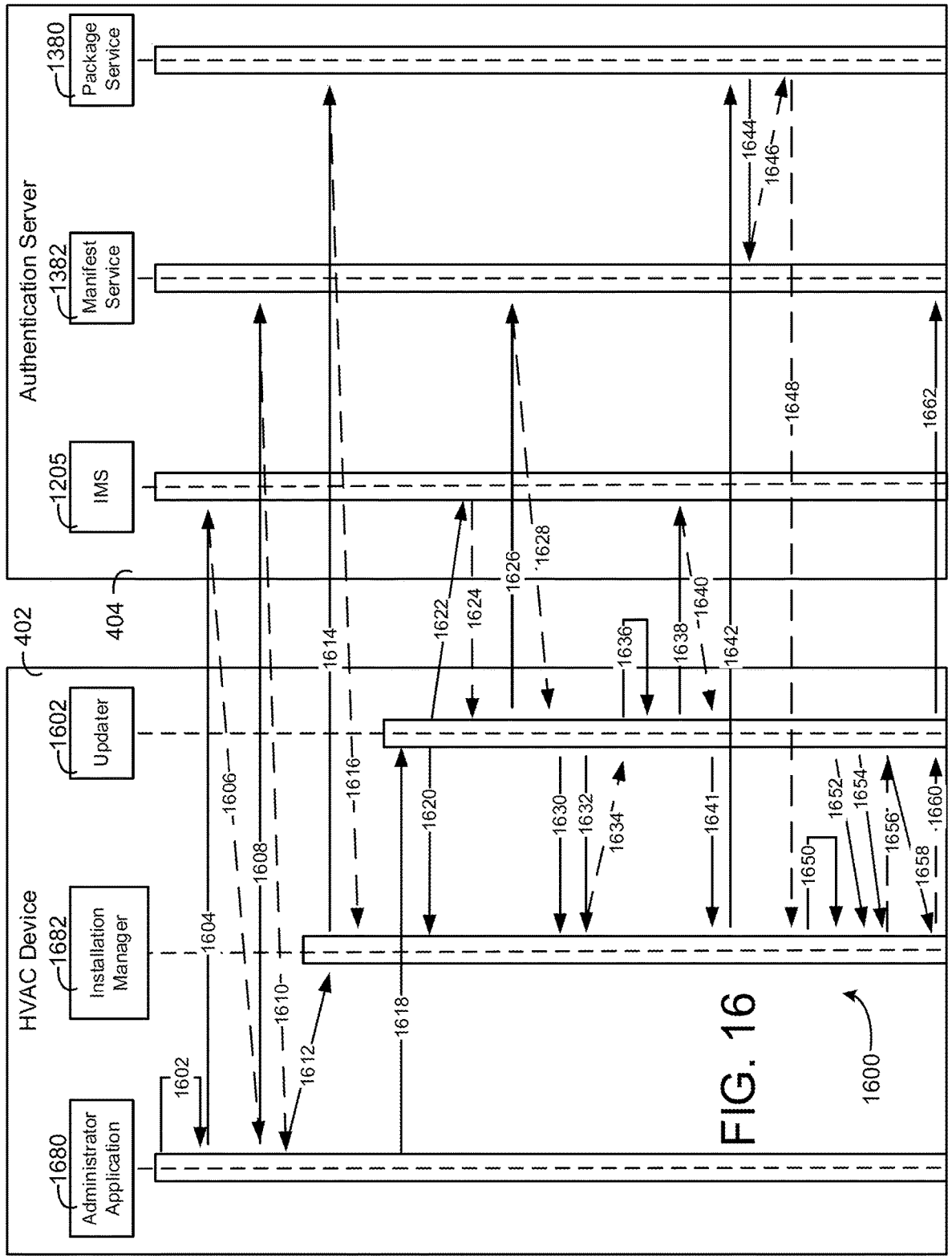
FIG. 16 is a flow diagram of a process for updating software on one of the HVAC devices of FIG. 4A when the HVAC device is online, according to an exemplary embodiment.

Referring now to FIG. 16, a process 1600 for updating software on HVAC device 402 when HVAC device 402 is online (e.g., connected to authentication server 402), according to an exemplary embodiment. HVAC device 402 is shown to include administrator application 1680, installation manager 1682, and updater 1602. Administrator application 1680 can be an interface for a user to upload a manifest file and/or otherwise interface with HVAC device 402. Administrator application 1680 can receive user input and/or can automatically perform various functions to update software on HVAC device 402. Installation manager 1682 can be a component of HVAC device 402 that handles installing software updates for HVAC device 402. In some embodiments, installation manager 1682 is and/or includes a software manager such as Chocolatey.

In step 1602, administrator application 1680 can determine if it should update software of HVAC device 402. In some embodiments, administrator application 1680 receives user input that indicates that HVAC device 402 should update software and/or a manifest of HVAC device 402. In various embodiments, a timer (e.g., a once a day timer, a once a week timer, etc.) expiries in step 1680 and indicates that it is time for HVAC device 402 to perform a software and/or manifest update.

In step 1604, administrator application 1602 may send a request to IMS 1205 for an access token which IMS 1205 may return to administrator application 1680 in step 1606. The access token may allow HVAC device 402 to retrieve a manifest. In step 1608, administrator application 1680 may send a request to manifest service 1382 for a manifest. The request may include the access token of step 1606. Manifest service 1382 may return the manifest in step 1610. In some embodiments, manifest service 1382 only returns the manifest if the access token it receives in step 1608 is current (e.g., has not expired) and authorizes HVAC device 402 to the manifest. In step 1612, administrator application 1680 can send a command to installation manager 1682 to install software based on a source (e.g., a URL, a file location, etc.). In some embodiments, the source is stored by installation manager 1682 an is a source for a software download for a license indicated in the manifest received by administrator application in step 1610.

In response to receiving an update command from administrator application 1680, installation manager 1682 can retrieve a software download based on the source for the software license. In some embodiments, installation manager 1682 further uses the access token administrator application 1682 receives in step 1606. Based on the software request, package service 1380 may return the software in step 1616. In some embodiments, in response to not receiving the software in step 1616 (e.g., the source is incorrect), administrator application may send a command to update sources in step 1618. This may be performed in response to the software update of step 1614 failing.

In step 1620, updater 1602 can clean any sources stored by installation manager 1682. Installation manager 1682 may store the locations (e.g., sources) (e.g., URL, file location, etc.) of various pieces of software, software add-ons, or software versions that HVAC device 402 is licensed for (entitled to). In some embodiments, cleaning involves removing old sources, testing and removing broken sources, etc. In step 1630, updater 1602 may update the sources of installation manager 1682. In some embodiments, updater 1602 uses the manifest that HVAC device 402 receives in step 1610 to update the sources of installation manager 1682. The received manifest may include the various sources of the software that HVAC device 402 is entitled to. In step 1632, updater 1602 may retrieve a list of software applications that are installed on HVAC device 402. In some embodiments, installation manager 1682 stores (or can generate) a file listing all of the software stored on HVAC device 402. In some embodiments, the file is sent to updater 1602 in step 1634.

Based on the received file and/or the manifest, updater 1602 can determine what software updates are available for HVAC device 402. In some embodiments, updater 1602 compares the software licenses of the manifest that HVAC device 402 receives to the software that is currently installed on HVAC device 20 to identify if there are any new software licenses and/or new software applications that HVAC device 402 should install. In step 1638, updater 1602 retrieves an access token and/or identifier for a software update from IMS 1205. IMS 1205 may return the access token step 1640. Updater 1602 can send a command to installation manager 1682 to install a software update via the token received in step 1641, the command may include a particular identifier for the software update, and/or a particular version for the software update.

In step 1642 installation manager 1682 may send a software request to package service 1380 which may include the identifier for the software update and/or a token. In some embodiments, installation manager 1682 sends the update request based on a source that installation service 1652 stores that indicates where to retrieve the software update. The request may include the access token received in step 1624. In step 1644, package service 1380 may validate the token received in step 1642 by communicating with IMS 1205. In step 1646, IMS 1205 may authenticate the token and/or indicate that the token is not authentic and/or expired. In response to the token being authorized, package service 1380 can send the software update to installation manager 1682 in step 1648.

In step 1650, installation manager 1682 can install the software update received in step 1648. In some embodiments, installing the software update includes retrieving and/or installing any dependencies that are required for the software update. In step 1652, updater 1602 can clean the sources stored by installation manager 1682. In step 1684, updater 1602 can retrieve a list of installed applications that HVAC device 1682 currently has installed. Installation manager 1682 may return the list to updater 1602. The listed may include the newly installed software installed in step 1650. In step 1656 updater 1602 can receive any global configuration from installation manager 1682 and/or make any changes to the global configuration.

Updater 1602 may review the global configuration to make sure all of the software on HVAC device 4012 is properly installed. In step 1662, updater 1602 may send an update for the manifest for HVAC device 402 to manifest service 1382. The update may include the token received in step 1606 and/or may include the list of currently installed software the updater 1602 retrieves in steps 1654 and 1656. Manifest service 1382 may update the manifest for HVAC device 402 based on the list of currently installed software on HVAC device 402 so that the manifest stored and/or generated by manifest service 1382 indicates all software that is installed on HVAC device 402.

Figure 17:
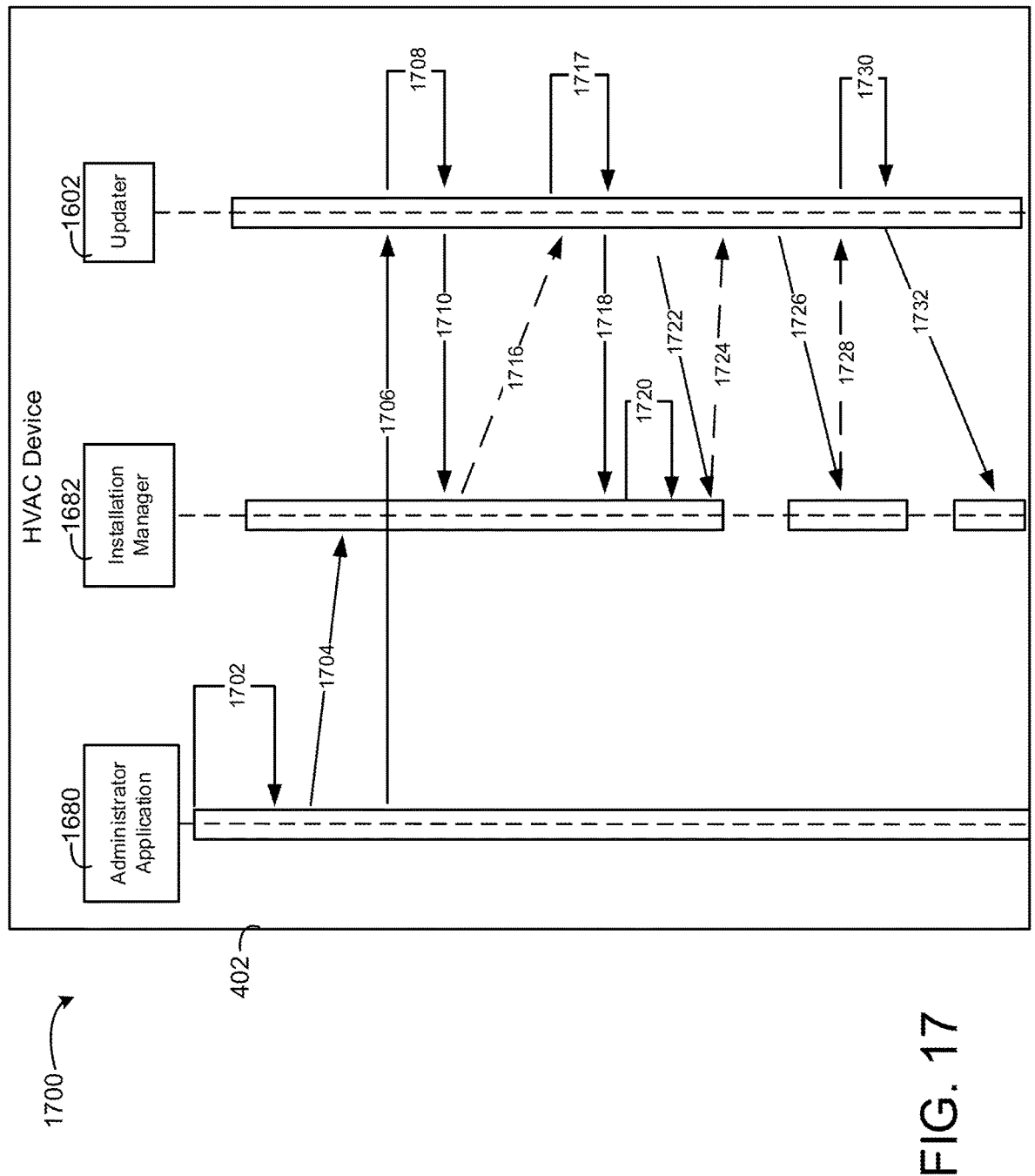
FIG. 17 is a flow diagram of a process for updating software on one of the HVAC devices of FIG. 4A when the HVAC device is offline, according to an exemplary embodiment.

Referring now to FIG. 17, a process 1700 for updating software on HVAC device 402 when HVAC device 402 is offline (e.g., not connected to authentication server 402) but is located in building 10 is shown, according to an exemplary embodiment. HVAC device 402 is shown to include various components that are described with further reference to FIG. 16. The components include administrator application 1680, installation manager 1682, and updater 1602.

In step 1702, a user may upload a manifest file that includes a manifest for HVAC device 402. In some embodiments, the file is manually uploaded (as shown in FIG. 17) since HVAC device 402 may be offline. In step 1704, administrator application 1680 may send a command to installation manager 1682 to update software for HVAC device 402 based on a source (e.g., a file destination, a URL, etc.) and/or an access token. In some embodiments, installation manager 1682 may not be able to install the update if the source is not correct or otherwise current. In some embodiments, installation manager 1682 may not be able to install the update since HVAC device 402 may be offline. In some embodiments, in response to the source being incorrect, administrator application 1680 may send the manifest file uploaded in step 1702 to updater 1602. In step 1708, updater 1602 may decrypt the manifest.

In some embodiments, updater 1602 uses a device ID and/or a device key to decrypt the manifest. In step 1710, based on the decrypted manifest, updater 1602 can cause installation service 1682 to clean any current sources it stores (e.g., delete old sources, test sources and delete if not current, etc.). Further, based on the decrypted manifest, updater 1602 may update the sources that installation manager 1682 may store. The manifest may include various locations for software that HVAC device 402 is licensed for. Finally, in step 1710, updater 1602 may request installation manager 1682 to send updater 1602 a list of the current installed software on HVAC device 402. In step 1716, installation manager 1682 may provide a list of the currently installed software to updater 1602 in response to step 1710.

In step 1717, updater 1602 can determine what software of HVAC device 402 needs to be updated. In some embodiments, the manifest decrypted in step 1708 indicates the software that HVAC device 402 is entitled to. In some embodiments, updater 1602 can determine, based on the decrypted manifest and/or the list of installed application received in step 1716, whether a new piece of software should be installed, a new version of software should be installed, or a new software add-on should be installed.

In step 1718, updater 1602 can send a command to installation manager 1682 to update and/or install new software. In some embodiments, the command includes an identifier of the software or software update to install, a particular version that should be installed, and/or an access token. In step 1720, installation manager 1682 can install the software updates and/or any dependencies necessary for the software updates. Installation manager 1682 may retrieve the software updates based on the sources that it may store and/or installation manager 1602 may have updated (e.g., updated in step 1710). In some embodiments, HVAC device 402 waits to go online before retrieving the software from the source since the HVAC device 402 may need to be online to retrieve the software update. In some embodiments, the software is manually uploaded by a user (e.g., via a USB drive, CD, etc.). In some embodiments, HVAC device 402 is connected to a local server or system that it can retrieve the software download from even though HVAC device 402 may be disconnected for authentication server 404. In step 1722, updater 1602 can send a command to clean the sources which may be the same and/or similar to the cleaning of step 1710. In step 1722, updater 1602 can again retrieve a list of installed applications from installation manager 1682 which installation manager 1682 can use to identify if all the software updates have been properly installed.

In steps 1722 and 1724, updater 1602 can retrieve global configuration settings from installation manager 1682 and perform any necessary configuration. The configuration settings may be settings for the installed software of HVAC device 402, e.g., the software installed in step 1720. In step 1730, installation manager 1602 can encrypt the manifest. In some embodiments, updater 1602 encrypts the manifest based on a device ID and a device key. The manifest that updater 1602 encrypts in step 1730 may be the manifest uploaded in step 1702. In step 1732, updater 1602 may store the encrypted manifest in installation manager 1682.

Figure 18:
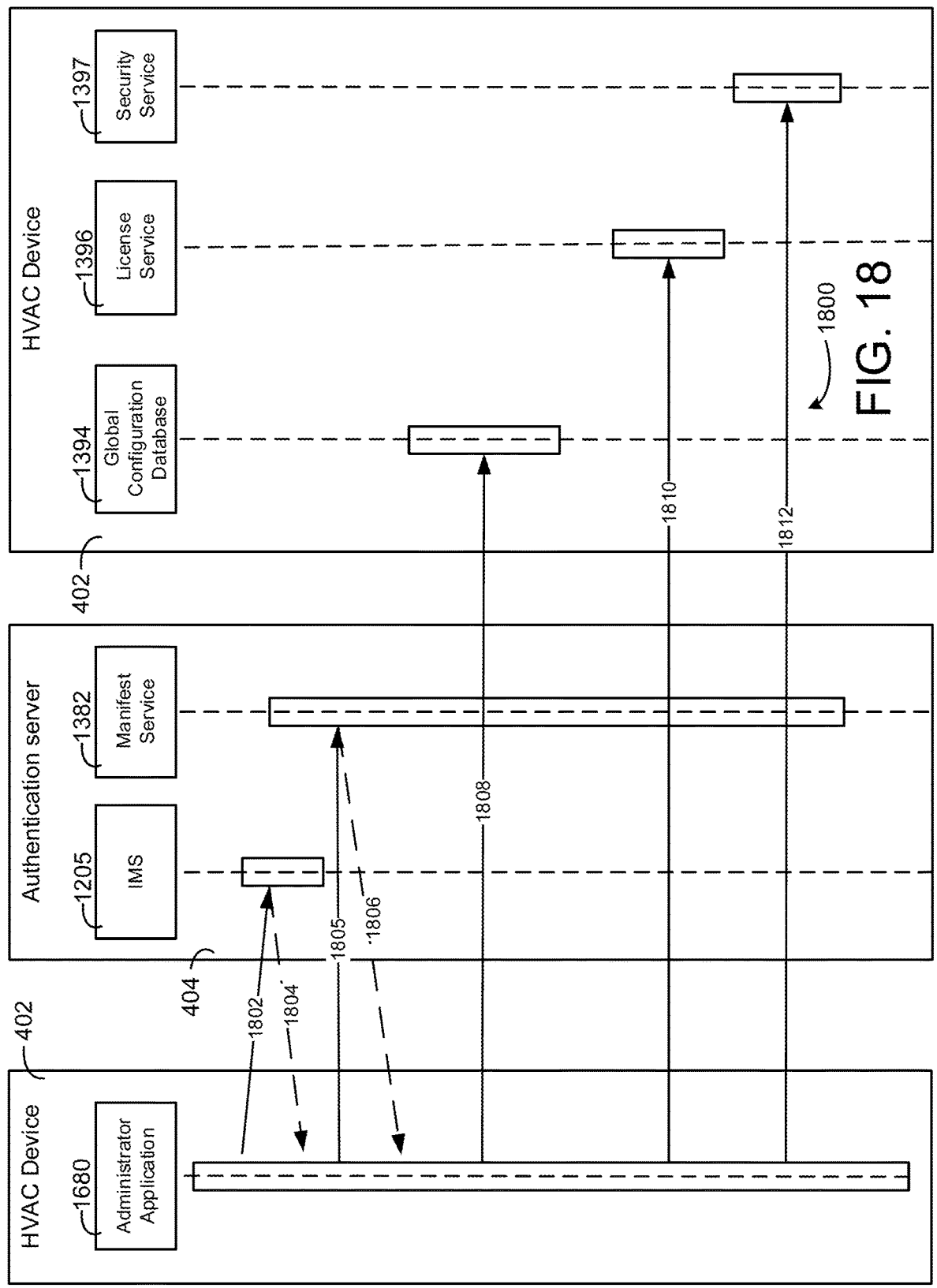
FIG. 18 is a flow diagram of a process for registering one of the HVAC devices of FIG. 4A when the HVAC device is online, according to an exemplary embodiment.

Referring now to FIG. 18, a process 1800 is shown for registering HVAC device 402 when HVAC device 402 is online, connected to device manager 1210, and is located on premises, is located in building 10, according to an exemplary embodiment. In step 1802, administrator application 1680 sends a request for an access token to IMS 1205. The access token may be a timed access key that allows administrator application to request information and/or store information in device manager, i.e., perform steps 1805, 1808, 1810, and/or 1812. In response to receiving the access token in step 1804, administrator application 1680 can send a request for the manifest of HVAC device 402 to manifest service 1382 in step 1805. Manifest service 1382 can reply with the manifest for administrator application 1680 in step 1806. Administrator application 1680 can decrypt the manifest based on a device ID and a device key.

In step 1808, administrator application 1680 can save configuration information of HVAC device 402 to global configuration database 1394. In step 1810, administrator application 1680 can store license information for HVAC device 402 in license service 1396, the license information may be based on the manifest received in step 1806. In step 1812, administrator application 1680 can store an organization data structure in security service 1397. In some embodiments, the organization data structure identifies various relationships between various entities (e.g., user, device, group) and various licenses for each entity and/or HVAC device 402.

Figure 19:
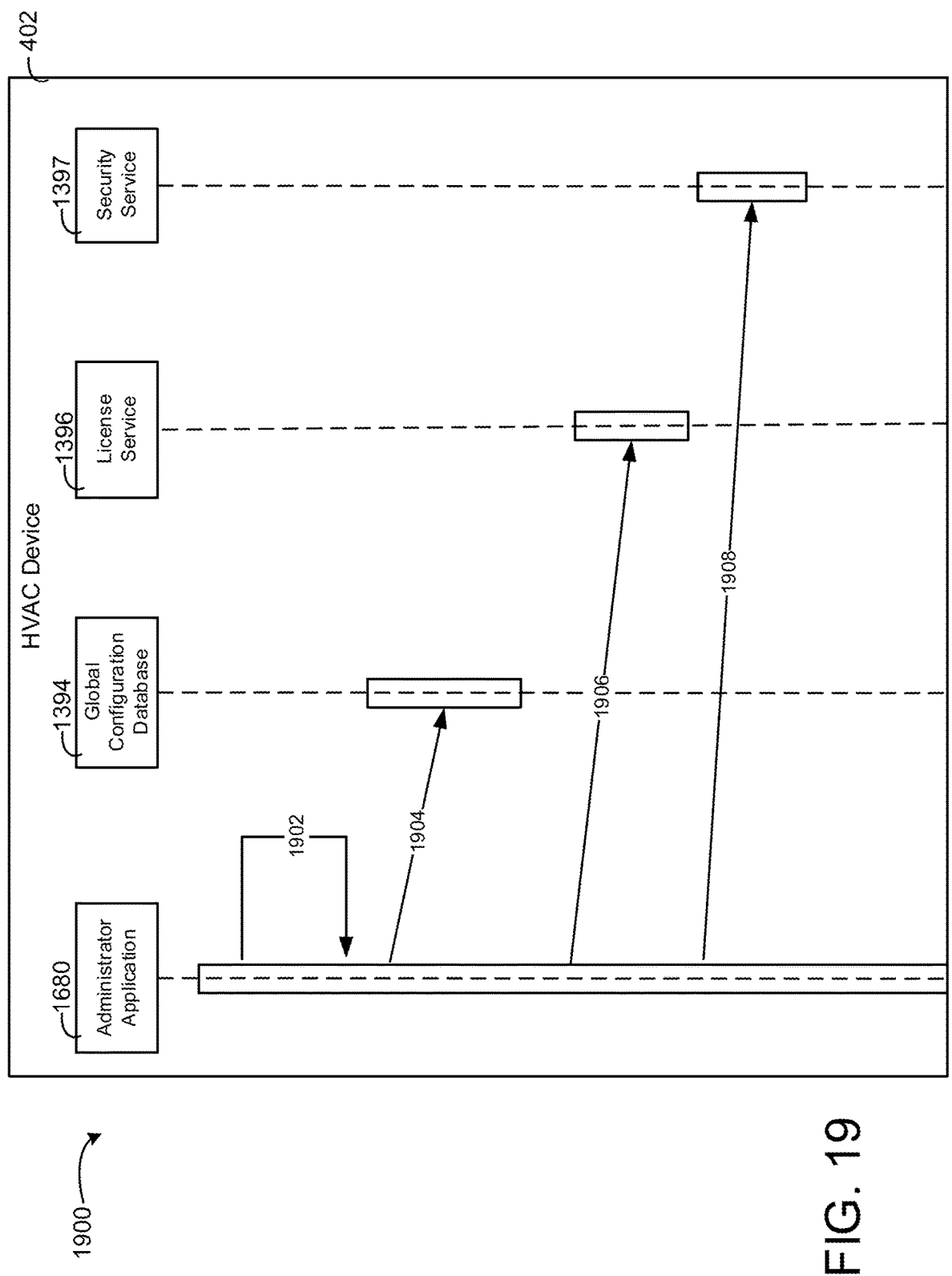
FIG. 19 is a flow diagram of a process for registering one of the HVAC devices of FIG. 4A when the HVAC device is offline, according to an exemplary embodiment.

Referring now to FIG. 19, a process 1900 is shown for registering HVAC device 402 when HVAC device 402 is offline, not connected to authentication server 404, and is located on premises, is located in building 10, according to an exemplary embodiment. In step 1902, administrator application 1680 may read a manifest that has been manually uploaded to HVAC device 402. HVAC device 402 may decrypt the manifest via a device ID and/or a device key. Based on the manifest, administrator application 1680 can store configuration information indicated in the manifest in global configuration database 1394 in step 1904, store license information indicated in the manifest to license service 1396 in step 1906, and store an organization data structure to security service 1397 in step 1908.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A heating ventilation and air conditioning (HVAC) system for a building space, the system comprising:
an HVAC device for the building space comprising a processing circuit comprising a memory, wherein the processing circuit is configured to:
store, in the memory, a manifest comprising a set of entitlements for the HVAC device based on relationships between the HVAC device and entities, wherein each entitlement of the set of entitlements includes a license to operate a piece of building equipment;
receive, via a user interface, a request to adjust a configuration of a piece of building equipment of the HVAC system, the request comprising an account identifier of a user account that initiated the request;
identify an entitlement of the set of entitlements that indicates a relationship between the HVAC device and the piece of building equipment;
determine a level of access for the account identifier that is associated with the identified entitlement; and
responsive to the level of access satisfying a configuration policy, adjust the configuration of the piece of building equipment according to the request.

2. The system of claim 1, wherein the manifest comprises a set of relationships between entities comprising one or more relationships between group entities, user entities, and device entities;
wherein the set of entitlements for the HVAC device comprises at least one of an entitlement for a software operating version for the HVAC device, an entitlement for a software add-on for the HVAC device, and an entitlement that configures the HVAC device to collect data from a second device and send commands to the second device which cause the second device to affect an environmental change in the building space.

3. The system of claim 1, wherein the manifest indicates a location of a payload, wherein the processing circuit of the HVAC device is configured to retrieve the payload based on the location indicated by the manifest.

4. The system of claim 1, wherein the set of entitlements for the HVAC device is based on relationships between the HVAC device and the entities and further based on the entitlements of each entity;
wherein the relationships between the HVAC device and the entities comprises relationships between group entities and the HVAC device, user entities and the HVAC device, and device entities and the HVAC device.

5. The system of claim 4, wherein the relationships between the HVAC device and the entities further comprises relationships between each entity and other entities, wherein the relationships between each entity and the other entities comprise relationships between the group entities, the user entities, and the device entities with other group entities, other user entities, and other device entities.

6. The system of claim 1, wherein the processing circuit of the HVAC device is configured to:
receive a payload from an authentication server and update storage modules of the HVAC device according to the payload; and
prompt the user to confirm installation of the payload.

7. The system of claim 1, wherein the processing circuit of the HVAC device is configured to:
transmit the manifest stored on the HVAC device to an authentication server to determine whether the set of entitlements has been updated to a second set of entitlements by an authentication server, the second set of entitlements based at least in part on one or more of the relationships between the HVAC device and the entities;
receive, from the authentication server, an updated manifest comprising the second set of entitlements;
receive, via the user interface, a second request to adjust the configuration of the piece of building equipment of the HVAC system, the second request comprising the account identifier of the user account;
identify a second entitlement of the second set of entitlements that indicates a relationship between the HVAC device and the piece of building equipment;
determine a level of access for the account identifier that is associated with the identified second entitlement; and
responsive to the level of access not satisfying the configuration policy, reject the second request.

8. The system of claim 1, wherein the processing circuit of the HVAC device is configured to receive the manifest from an authentication server.

9. The system of claim 1, wherein the processing circuit of the HVAC device is further configured to:
receive, via a second user interface, a second request to adjust the configuration of the piece of building equipment, the second request comprising a second account identifier of a second user account that initiated the request;
identify the entitlement of the set of entitlements that indicates a relationship between the HVAC device and the piece of building equipment;
determine a second level of access for the second account identifier that is associated with the identified entitlement; and
responsive to the level of access not satisfying the configuration policy, reject the request.

10. The system of claim 1, wherein the user account is a user account of a plurality of user accounts that are associated with a group identifier, and wherein processing circuit of the HVAC device is further configured to determine the level of access based on a level of access of the group identifier.

11. A method for licensing devices in a building space of a heating ventilation and air condition (HVAC) system, the method comprising:
storing, by an HVAC device in a memory of the HVAC device, a manifest comprising a set of entitlements for the HVAC device based on relationships between the HVAC device and entities, wherein each entitlement of the set of entitlements includes a license to operate a piece of building equipment;
receiving, by the HVAC device via a user interface, a request to adjust a configuration of a piece of building equipment of the HVAC system, the request comprising an account identifier of a user account that initiated the request;
identifying, by the HVAC device, an entitlement of the set of entitlements that indicates a relationship between the HVAC device and the piece of building equipment;
determining, by the HVAC device, a level of access for the account identifier that is associated with the identified entitlement; and
responsive to the level of access satisfying a configuration policy, adjusting, by the HVAC device, the configuration of the piece of building equipment according to the request.

12. The method of claim 11, wherein the manifest comprises a set of relationships between entities comprising one or more relationships between group entities, user entities, and device entities.

13. The method of claim 11, wherein the set of entitlements for the HVAC device is based on relationships between the HVAC device and the entities and the entitlements of each entity;
wherein the relationships between the HVAC device and the entities comprises relationships between group entities and the HVAC device, user entities and the HVAC device, and device entities and the HVAC device.

14. The method of claim 13, wherein the relationships between the HVAC device and the entities further comprises relationships between each entity and other entities, wherein the relationships between each entity and the other entities comprise relationships between the group entities, the user entities, and the device entities with other group entities, other user entities, and other device entities.

15. The method of claim 11, the method further comprising:
transmitting, by the HVAC device, the manifest stored in the memory to an authentication server to determine whether the set of entitlements has been updated to a second set of entitlements by an authentication server, the second set of entitlements based at least in part on one or more of the relationships between the HVAC device and the entities;
receiving, from the authentication server, an updated manifest comprising the second set of entitlements;
receiving, via the user interface, a second request to adjust the configuration of the piece of building equipment of the HVAC system, the request comprising the account identifier of the user account;
identifying a second entitlement of the second set of entitlements that indicates a relationship between the HVAC device and the piece of building equipment;
determining a level of access for the account identifier that is associated with the identified second entitlement; and
responsive to the level of access not satisfying a configuration policy, rejecting the second request.

16. The method of claim 11, the method further comprising:
receiving, by an authentication server, the manifest stored in the memory;
comparing, by the authentication server, the manifest stored on the HVAC device to a manifest stored on the authentication server; and
sending, by the authentication server, the updated manifest to the HVAC device in response to determining that the manifest stored on the HVAC device does not match the manifest stored on the authentication server.

17. The method of claim 11, wherein the manifest indicates a location of a payload, further comprising retrieving the payload based on the location indicated by the manifest.

18. A device in communication with a heating ventilation and air conditioning (HVAC) system for a building space, the device comprising:
a processing circuit comprising a memory, wherein the processing circuit is configured to:
store, in the memory, a manifest comprising a set of entitlements for the device based on relationships between the device and one or more entities, wherein the relationships between the device and the entities comprises relationships between one or more group entities and the device, user entities and the device, and device entities and the device, and wherein each entitlement of the set of entitlements includes a license to operate a piece of building equipment;
receive, via a user interface, a request to adjust a configuration of a piece of building equipment of the HVAC system, the request comprising an account identifier of a user account that initiated the request;
identify an entitlement of the set of entitlements that indicates a relationship between the device and the piece of building equipment, wherein the entities include the piece of building equipment;
determine a level of access for the account identifier that is associated with the identified entitlement; and
responsive to the level of access satisfying a configuration policy, adjust the configuration of the piece of building equipment according to the request.

19. The device of claim 18, wherein the relationships between the device and the entities further comprises relationships between each entity and other entities, wherein the relationships between each entity and the other entities comprise relationships between the group entities, the user entities, and the device entities with other group entities, other user entities, and other device entities.

20. The device of claim 18, wherein the processing circuit of the device is configured to transmit the manifest stored on the device to an authentication server to determine whether the set of entitlements have been updated to a second set of entitlements by the authentication server, the second set of entitlements based at least in part on one or more of the relationships between the device and the entities.

* * * * *